(12) United States Patent
Roberts et al.

(10) Patent No.: US 12,504,996 B2
(45) Date of Patent: Dec. 23, 2025

(54) SYSTEMS AND METHODS TO ASSOCIATE AN EXCHANGE WITH ONE OF MULTIPLE CONTAINERS OF A CAPACITY PLAN

(71) Applicant: Simnang IP, LLC, Farmington, UT (US)

(72) Inventors: Rhett M. Roberts, Kaysville, UT (US); César Olea Aguilar, Hermosillo Sonora (MX)

(73) Assignee: Simnang IP, LLC, Farmington, UT (US)

( * ) Notice: Subject to any disclaimer, the term of this patent is extended or adjusted under 35 U.S.C. 154(b) by 574 days.

(21) Appl. No.: 17/949,459

(22) Filed: Sep. 21, 2022

(65) Prior Publication Data
US 2024/0095088 A1    Mar. 21, 2024

(51) Int. Cl.
  *G06F 9/50*    (2006.01)
  *G06F 9/445*   (2018.01)
  *G06N 5/02*    (2023.01)

(52) U.S. Cl.
  CPC ........ *G06F 9/5072* (2013.01); *G06F 9/44505* (2013.01); *G06F 9/5077* (2013.01); *G06N 5/027* (2013.01)

(58) Field of Classification Search
  CPC .................................................. G06F 9/5072
  See application file for complete search history.

(56) References Cited

U.S. PATENT DOCUMENTS

| | | | |
|---|---|---|---|
| 5,117,356 A | 5/1992 | Marks | |
| 5,742,775 A | 4/1998 | King | |
| 5,878,404 A | 3/1999 | Stout et al. | |
| 7,194,552 B1* | 3/2007 | Schneider | H04L 61/3015 709/217 |
| 8,401,970 B1 | 3/2013 | Patel et al. | |
| 8,666,880 B2 | 3/2014 | Ang et al. | |
| 9,767,299 B2 | 9/2017 | Selgas et al. | |
| 10,019,697 B2 | 7/2018 | Ang et al. | |

(Continued)

FOREIGN PATENT DOCUMENTS

JP    2015-118496 A    6/2015

OTHER PUBLICATIONS

Papandrea, "What Is a Citi Flex Plan and How Does It Work?", The Balance Money, Mar. 22, 2022, https://www.thebalancemoney.com/what-is-a-citi-flex-plan-5081199#:~:text=Citi Flex Pay lets you,using a fixed monthly payment.

(Continued)

*Primary Examiner* — Charlie Sun
(74) *Attorney, Agent, or Firm* — Foley & Lardner LLP

(57) ABSTRACT

Systems, methods, and computer-readable storage media to model exchanges of a capacity plan with configuration parameters and to provide a plurality of configuration parameters for individual exchanges included in a capacity plan. One system includes a communication network interface, a memory, and one or more processors. The memory to store a plurality of containers corresponding to the capacity plan, a ledger to broadcast exchanges associated with the capacity plan, and control structures to model exchanges with the configuration parameters of a given sub-ledger of the plurality of sub-ledgers. The one or more processors generate the plurality of containers and receive and broadcast exchanges.

20 Claims, 26 Drawing Sheets

(56) References Cited

U.S. PATENT DOCUMENTS

| | | |
|---|---|---|
| 10,037,623 B2 | 7/2018 | Brandts et al. |
| 10,853,902 B2 | 12/2020 | Atkinson et al. |
| 2002/0087441 A1 | 7/2002 | Wagner et al. |
| 2003/0009402 A1 | 1/2003 | Mullen et al. |
| 2005/0216421 A1 | 9/2005 | Barry et al. |
| 2005/0251469 A1 | 11/2005 | Nandakumar |
| 2006/0143124 A1* | 6/2006 | Ehrke ............ G07F 19/20 |
| | | 705/40 |
| 2006/0167771 A1 | 7/2006 | Meldahl |
| 2007/0250442 A1 | 10/2007 | Hogan et al. |
| 2008/0065532 A1 | 3/2008 | De La Motte |
| 2009/0030819 A1 | 1/2009 | VanLeeuwen |
| 2014/0114857 A1 | 4/2014 | Griggs et al. |
| 2014/0279507 A1* | 9/2014 | Whitler ............ G06Q 40/02 |
| | | 705/44 |
| 2015/0235221 A1 | 8/2015 | Murphy et al. |
| 2016/0086160 A1 | 3/2016 | Desai et al. |
| 2017/0046667 A1 | 2/2017 | Feng et al. |
| 2018/0040064 A1 | 2/2018 | Grigg et al. |
| 2018/0293573 A1 | 10/2018 | Ortiz et al. |
| 2019/0130453 A1 | 5/2019 | Sasapu |
| 2020/0241929 A1 | 7/2020 | Arrasjid et al. |
| 2020/0250661 A1 | 8/2020 | Padmanabhan et al. |
| 2021/0398121 A1 | 12/2021 | Jackson |
| 2022/0114566 A1* | 4/2022 | Lacoss-Arnold .... G06Q 20/405 |
| 2022/0129981 A1 | 4/2022 | Mcwilliams et al. |
| 2022/0292516 A1 | 9/2022 | Mimassi |
| 2022/0318807 A1 | 10/2022 | Rohlfing et al. |
| 2022/0398340 A1 | 12/2022 | Jakobsson et al. |
| 2023/0196345 A1* | 6/2023 | Buradagunta ...... G06Q 20/3825 |
| | | 705/64 |

OTHER PUBLICATIONS

International Search Report and Written Opinion dated Jan. 9, 2024 for PCT/US2023/032603.

M.A. Muhtasim, S. Ramisa Fariha, R. Rashid, N. Islam and M. A. Majumdar, "Secure Data Transaction and Data Analysis of IoT Devices Using Blockchain," 2018 International Conference on Circuits and Systems in Digital Enterprise Technology (ICCSDET), Kottayam, India, 2018, pp. 1-8, (Secure). (Year: 2018).

* cited by examiner

LINE OF CREDIT

YOU CAN CREATE PRODUCTS FOR YOUR COMPANY'S CAPACITY PLAN OFFERINGS. THESE OFFER A QUICK WAY TO CREATE ACCOUNTS WITH UNIQUE DEFAULTS DEPENDING ON THE PRODUCT.

4 RESULTS

[ADD] — 614

| ◆ NAME | STATUS | 618 |
|---|---|---|
| DEFAULT ID:1 — 602 | ◯— 612A | ✎ — 616 |
| CONSTRUCTION ID:2 — 604 | ◯— 612B | ✎ |
| FINE DINING ID:3 — 608 | ◯— 612C | ✎ |
| THE DIY ID:4 — 610 | ◯— 612D | ✎ |

SHOW [10▼] ENTRIES   [◀] [1] [▶]

FIG. 6A

| ACCOUNT SETUP | ACCOUNT SETTINGS | AVAILABLE CREDIT | DEFAULTS |

627 {

ACCOUNT SETUP

OPEN DATE OFFSET
0
FIRST DUE DATE OFFSET
2

FIRST STATEMENT DATE OFFSET
1
DRAW PERIOD EXPIRATION DATE OFFSET

STATEMENT FREQUENCY
MONTHLY
TOTAL CREDIT LIMIT
$10,000.00

628A

Containers

PURCHASES
INCLUDE ON ACCOUNT
CREDIT LIMIT
$10,000.00
NEW TRANSACTIONS
INCLUDE
INTEREST ABATEMENT DAYS
0
STRUCTURAL SUPPLIES & MATERIALS
NOT INCLUDE ON ACCOUNT
DIY PROJECTS
NOT INCLUDE ON ACCOUNT
CONSTRUCTION MATERIALS
NOT INCLUDE ON ACCOUNT
CONSTRUCTION LABOR
NOT INCLUDE ON ACCOUNT
HOME IMPROVEMENT STORES

INTEREST CHARGE METHOD
INTEREST
INTEREST RATE
24.9900%

COMPUTATION METHOD
AVERAGE DAILY BALANCE
INTEREST ABATEMENT METHOD
OPEN DATE

STANDARD CAPACITY PLAN

FIND PRODUCT —660

◆PRODUCT NAME
○ THE DIY  662A
○ FINE DINING  662B
○ CONSTRUCTION  662C
○ DEFAULT  662D

SHOW [10 ▼] ENTRIES

VIEWING 1 TO 4 OF 4  664

CANCEL

① SELECT PRODUCT  ② CONFIGURE ACCOUNT  ③ ASSIGN CUSTOMER

NEXT — 665

FIG. 6J

STANDARD CAPACITY PLAN
ENTER INFORMATION ABOUT THE CAPACITY PLAN INFORMATION AND CONTAINERS
ACCOUNT INFORMATION SECTION

ACCOUNT ID OPTION *  ACCOUNT ID *
CUSTOM ID  ▸  1008        ⎫
                          ⎬ 666
AGENT USER    SOURCE COMPANY ⎭
NONE       ▸

PORTFOLIOS
THERE ARE NO ITEMS IN THIS CATEGORY.

[ADD PORTFOLIO]
        668

① SELECT PRODUCT  ② CONFIGURE ACCOUNT  ③ ASSIGN CUSTOMER
                          ⎿ 664 ⏌

[BACK] [CANCEL]                              [NEXT]
                                              665

FIG. 6K

| SUMMARY | SERVICING▼ | AUTOPAY | STATEMENTS | CUSTOMER▼ | TOOLS▼ | ACCOUNT SETTINGS▼ | REPORTS▼ | COLLATERAL | |
|---|---|---|---|---|---|---|---|---|---|
| | | | | | | | | | CALCULATOR ENABLED ⊙ 674A |

ACCOUNT SETUP

OPEN DATE
09/07/2022

FIRST DUE DATE
09/09/2022

FIRST STATEMENT DATE
09/08/2022

DRAW PERIOD EXPIRATION DATE

STATEMENT FREQUENCY
MONTHLY

TOTAL CREDIT LIMIT
$250,000.00         674B

CONTAINER

STRUCTURAL SUPPLIES & MATERIALS
INCLUDE ON ACCOUNT

CREDIT LIMIT
$250,000.00

NEW TRANSACTIONS
INCLUDE

INTEREST ABATEMENT DAYS
0

LABOR
NOT INCLUDE ON ACCOUNT

INTERIOR SUPPLIES & MATERIAL
NOT INCLUDE ON ACCOUNT

INTEREST CHARGE METHOD
INTEREST

INTEREST RATE
12.4900%

COMPUTATION METHOD
DAILY BALANCE

INTEREST ABATEMENT METHOD
OPEN DATE                674C

FIG. 6M

| SUMMARY | SERVICING▼ | AUTOPAY | STATEMENTS | CUSTOMER▼ | TOOLS▼ | ACCOUNT SETTINGS▼ | REPORTS▼ | COLLATERAL |

ACCOUNT SETTINGS

AGENT USER
NONE
ACCOUNT STATUS
UNDERWRITING
EBILLING
NO
REPORTING TYPE
CAPACITY PLAN
CREDIT STATUS
0 - AUTO - ALLOW SYSTEM TO MANAGE THIS FIELD
MERCHANT PROCESSOR GROUP
.

AUTOPAY STATUS
SUSPEND PROCESSING AUTOPAYS
ACCOUNT SUB STATUS
NEW APPLICATION
REPOSESSION DATE
09/07/22
LIQUIDATION DATE
09/07/22
CREDIT BUREAU
18. - CREDIT CARD
PAYMENT TYPE DEFAULT
REGULAR

PRIMARY ECOA CODE
0 - NOT SPECIFIED
SECONDARY ECOA CODE
0 - NOT SPECIFIED
CLOSE DATE
09/07/22
FOLLOW UP DATE
09/07/22
SOURCE COMPANY

STATEMENT TYPE
.                                                                678A

CUSTOM FIELDS

SOURCE OF BUSINESS
.                                                                678B

CONVENIENCE FEE

CONVENIENCE FEE
FIXED DOLLAR AMOUNT $5.00                                        678C

Log Payment

Amount*
$ 0.00

Apply Date*
09/07/22

Info*

Payment Type*
Select Option

Payment Method Details

Payment Profile
No Customer Available

Payment Method*
PleaseSelect

Custom Fields

Authorization Code

Log Container Transfer

Amount*
$ 0.00

Apply Date*
09/07/22

From Container
Iceland Travel (other)

To Container
Italy Travel (other)

Memo*

Cancel  Save

FIG. 6T

SYSTEMS AND METHODS TO ASSOCIATE AN EXCHANGE WITH ONE OF MULTIPLE CONTAINERS OF A CAPACITY PLAN

BACKGROUND

The present disclosure relates generally to the field of capacity plan technology. In a computer networked environment, such as the Internet, users, and entities such as people or companies participate in exchanges (e.g., transactions). The exchanges may involve terms that indicate how a computer is to process and/or update data for the exchanges over time. Storing data for the exchanges can involve storing data for each exchange in a single database (or collective record). Accordingly, processing the data for the exchanges can involve significant processing power to repeatedly query the database for individual exchanges, determine functions or terms to apply to the data of the exchanges, and then execute the functions or terms of the data.

SUMMARY

Systems and methods are disclosed for handling individual exchanges included in a capacity plan, utilizing multiple sets of parameters. Some implementations include receipt of data, including configuration data for the sets of parameters and exchange data. The multiple sets of parameters can specify one or more aspects of handling an exchange included in the capacity plan. Some implementations can receive control input to indicate control structures to associate exchanges with a set of parameters. Some implementations can compare exchange data to one or more control structures and broadcast the exchange in a sub-ledger of a plurality of sub-ledgers according to a control structure corresponding to the sub-ledger.

Figure 1:
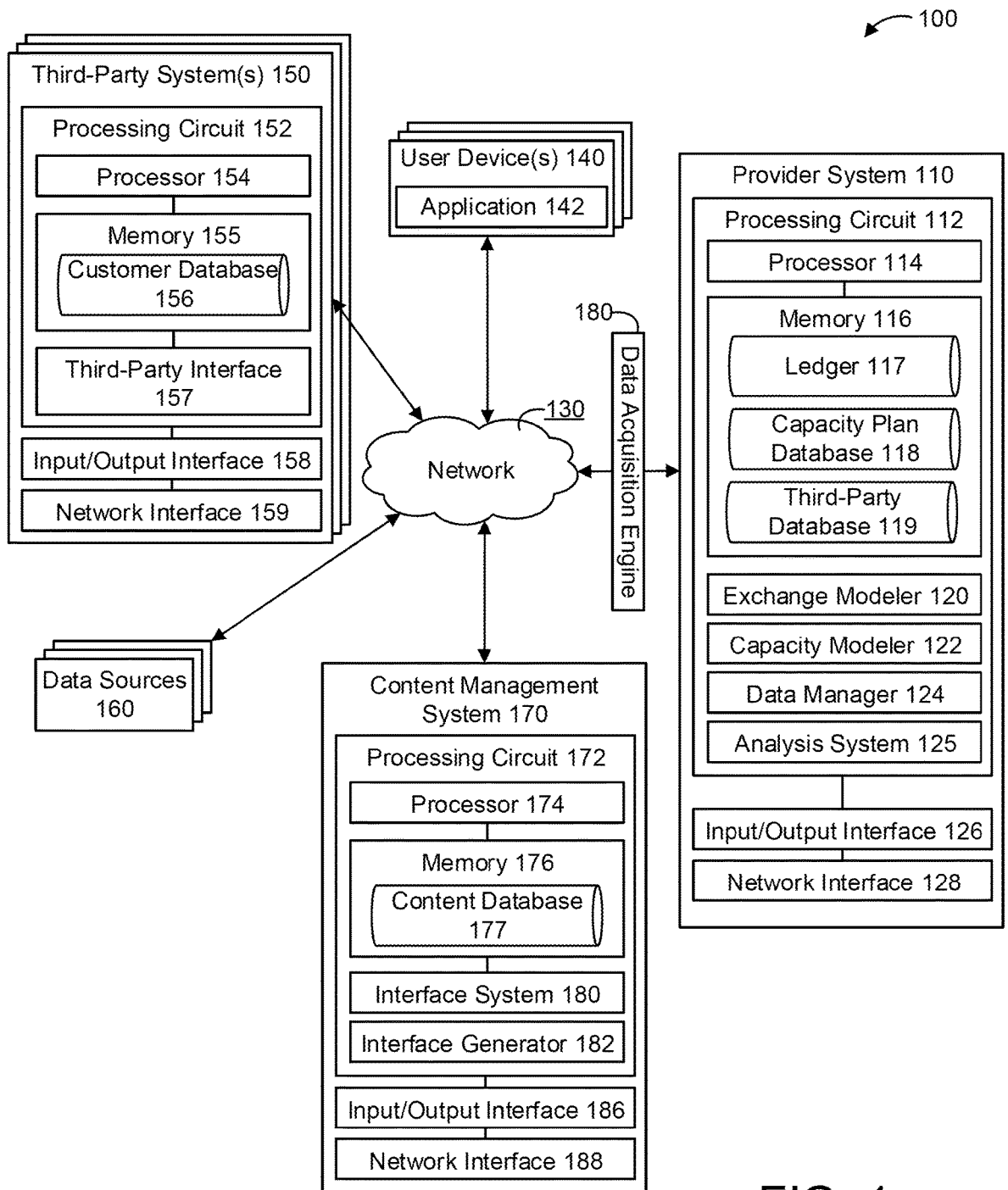
FIG. 1 is a block diagram depicting an implementation of a provider system and computing environment, according to some implementations.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The systems and methods described herein relate to multi-data structure architecture for recording, managing, and updating exchange data. The systems and methods address issues with storage, interoperability, and customization that may accompany pooling multiple exchanges into a single record of exchanges (or database of exchanges). In particular, the systems and methods relate to providing a plurality of configuration parameters for individual exchanges included in a capacity plan. A computer configured to implement the systems and methods described herein may dynamically assign exchanges to different containers of a capacity plan based on characteristic(s) of the exchanges, attributes or data of the capacity plans, and/or attributes of an individual or other entity involved in the exchange, and can store the exchanges on a ledger. The computer may then implement terms or rules of the different containers to which the exchanges are assigned to update data for the exchanges and the capacity plan. The implementation of the terms or rules of the containers and/or the updating data can be accomplished in real-time, or run-time, or in a delayed fashion using a queued, scheduled, or backlogged approach. Because the terms or rules may correspond to the containers and not each of the exchanges individually, the computer may conserve considerable memory and processing resources when processing and updating data for multiple exchanges linked to different containers compared with conventional systems that store records and terms for individual exchanges in a single record and individually query and process data for each exchange.

Additionally, because the terms or rules may correspond to the containers themselves in data structures separate from the ledger, the computer may conserve considerable memory and processing resources when processing and updating data for multiple exchanges that are linked to different containers. For example, a conventional computer may store records for individual exchanges for a capacity plan in a single database having only a single set of terms or rules. Therefore, the conventional computer may store and update multiple disparate databases to process and update data for multiple exchanges for multiple sets of terms or rules.

In one example, the exchange data for individual exchanges may be stored in separate entries on a single ledger. A computer may have routed each of the exchanges to a container storing one or more configuration parameters based on a set of control structures. The computer may label each of the entries for the exchanges with a container label indicating the containers to which the exchanges were routed. Accordingly, when updating the data for individual exchanges, the computer may retrieve the exchanges that correspond to a specific container using the label for the container as an index. The computer may apply the configuration parameters of the container to the data for the retrieved exchanges. The computer may then transmit the updated exchange data to the ledger to update the ledger with new entries or by updating existing entries in the ledger with the updated exchange data.

By routing exchanges to containers on the front end (e.g., labeling exchanges on the ledger with labels for containers to which the exchanges have been routed or storing the exchanges in separate ledgers (or sub-ledgers) that are dedicated to exchanges routed to containers of the ledgers), a calculator the computer executes to update the exchanges can operate more efficiently and quickly because the calculator may avoid parsing individual exchanges one at a time identifying which terms to apply to which exchange. The calculator may not need to process configuration parameters that do not apply to the containers to which the exchanges were assigned because the calculator can update the exchanges for each container in isolation. The computer may separately perform calculations for each container in this way and then compile the calculations to update the capacity plan for the ledger. This process is faster, more accurate, and more scalable as a micro-service because the calculator may only need to be aware of the configuration parameters of individual containers and the exchanges linked to the containers, not any other noise.

Another advantage to implementing the systems and methods described herein is that routing exchanges to buckets increases the tools that are available for fraud detection and prevention. For example, because the computer can categorize different exchanges into different containers, the computer can identify unusual exchange patterns in the different containers (e.g., a malicious actor that goes on a spending spree purchasing new cars using someone else's card). The computer can identify such irregularities based on a sudden change in values or frequency of exchanges in individual containers and generate an alert to a fraud detection system For example, in many systems, service providers can create accounts or lines of credit for exchanges (e.g., credit card account, debit card account). An account can be used by a customer of the service provider and the recordation of the exchange can be linear. A single set of terms is generally associated with all exchanges of the account. However, customers of the service provider may desire to customize their account to route exchanges of the account to be handled according to one of multiple sets of terms and also allow the account to be updated in real-time. Moreover, the service provider may desire to customize the account to the customer, for example, so as to incentivize usage of the account by the customer. The service provider may desire to offer multiple sets of terms for handling exchanges with one or more of the multiple sets of terms customized for the customer.

A computer implementing the systems and methods described herein may overcome the aforementioned technical deficiencies by providing service providers and/or customers with the ability to customize sets of terms (also referred to herein as "containers" or "buckets") for handling exchanges for the customers. A user may customize multiple sets of terms for an account such that the account can be used to make purchases for specific aspects of the customer's lifestyle (e.g., restaurants, birthday, wedding, holiday) or other habits, and according to customized terms. The computer may provide the user with this technical capability while improving storage capacity and reducing resource utilization, providing capacity plan models (e.g., enabling routing execution of exchanges and exchange recording) with enhanced performance and efficiency while reducing the storage capacity of service providers. This approach allows capacity plan models to provide significant improvements to exchange routing and predictions such that the customizable accounts and performance of the capacity plan models is improved and, as a result, enables services providers to reduce resource allocation of storing exchanges. Aspects of the present disclosure address problems specific to computing in managing different accounts by designing a capacity plan model that utilizes configuration parameters and control structures to dynamically assign exchanges to a container of a capacity plan.

As used herein, a "capacity plan" is an account or line of credit (LOC) enabling customers (e.g., borrowers) of service providers (e.g., financial institutions ("FI"), credit card institutions, other borrowing/lending services) to draw on the account or LOC when the customer desires to borrow funds (e.g., fiat money, digital currency, cryptocurrency) or other assets (e.g., physical, or digital).

As user herein, a "container" (also referred to as a "bucket") provides a set of terms (or rules) for handling exchanges of the capacity plan as specified by configuration parameters. A container can be considered to define a sub-account or sub-line of credit (SLOC), with configuration parameters unique to the sub-account. The configuration parameters can include a set of terms by which an exchange (sometimes referred to herein as a "transaction") is handled by the container. Each capacity plan can include a plurality of containers and can have configuration parameters per container.

As used herein, a "control structure" is a data structure including one or more instructions (e.g., controls and rules) executable by a processing circuit to route and broadcast (e.g., record) an exchange to a container (or to a sub-ledger corresponding to a container). For example, a control structure can include a control heuristic that can model a received exchange and broadcast the exchange in an appropriate sub-ledger. In another example, a control structure can include a smart contract that includes controls (or rules or parameters) for routing an exchange, via broadcast, to an appropriate sub-ledger. In some implementations, the control structure can restrict or allow access (e.g., restrict or allow broadcasting) to a particular sub-ledger based on the control heuristic or smart contract.

FIG. 1 is a block diagram depicting an implementation of a provider system 110 and a computing environment 100, according to some implementations. The computing environment 100 is shown to include the provider system 110, user devices 140, third-party systems 150, data sources 160, and content management system 170. The plurality of devices and/or systems 110, 140, 150, 160, and/or 170, may initiate, collect, and/or route (e.g., provide) data over a network 130. The data acquisition engine 180 may provide a single application programming interface (API) or multiple APIs to access various data generated, stored, or routed by devices and systems 110, 140, 150, 160, and/or 170.

Each system or device in the computing environment 100 may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, memory 116 may store programming logic that when executed by a processor 114 within processing circuit 112, causes a capacity plan database 118 to update information for a capacity plan with communications received from a user device 140 or a third-party system 150. The network interfaces (e.g., a network interface 128 of the provider system 110) may allow the computing systems and devices to communicate wirelessly or otherwise, e.g., via the network 130. The various components of devices in the computing environment 100 may be implemented via hardware (e.g., circuitry), software (e.g., executable code), or any combination thereof. Systems, devices, and components in FIG. 1 can be added, deleted, integrated, separated, and/or rearranged in various embodiments of the disclosure.

The provider system 110 includes a network interface 128, a processing circuit 112, and an input/output device 122. The network interface 110 is structured and used to establish connections with other computing systems and devices (e.g., the user devices 140, the third-party system 150, the data sources 160, the content management system 170, etc.) via the network 130. The network interface 128 includes program logic that facilitates connection of the provider system 110 to the network 130. For example, the network interface 128 may include any combination of a wireless network transceiver (e.g., a cellular modem, a Bluetooth transceiver, a Wi-Fi transceiver, etc.) and/or a wired network transceiver (e.g., an Ethernet transceiver). In some implementations, the network interface 128 includes the hardware (e.g., processor, memory, and so on) and machine-readable media sufficient to support communication over multiple channels of data communication. Further, in some arrangements, the network interface 128 includes cryptography capabilities to establish a secure or relatively secure communication session in which data communicated over the session is encrypted. In various embodiments, the network 130 can adapt to network traffic needs by compressing content, using any computing device described herein, and sending it (e.g., via network 130) to various other computing devices, by adjusting security filters to remove junk traffic from network 130 (e.g., by monitoring packets), and so on.

The processing circuit 112 includes a processor 114, a memory 116, a ledger 117, a capacity plan database 118, a third-party database 119, an exchange modeler 120, a capacity modeler 122, a data manager 124, and an analysis system 125. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. The memory 116 may be communicably and electrically coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider system 110 is configured to execute a variety of tasks and jobs and store associated data in a database of the memory 116 (e.g., the ledger 117, the capacity plan database 118, the third-party database 119).

The memory 116 may store a ledger 117, according to some embodiments. The ledger 117 may include a plurality of sub-ledgers. Each of the sub-ledgers can be identified with categorization mechanisms of a capacity plan name and a container (or bucket) name. In some implementations, the ledger 117 can map a root (e.g., dummy) to capacity plans, and each capacity plan can be mapped to a plurality of containers. Thus, the ledger 117 can generate and assign an identifier to each container based on a naming convention. For example, each container may be given a CP—#######—bucket—####identifier. Each of the containers can store sub-ledger values (e.g., a set of configuration parameters, identifiers of the containers, exchange data for the containers, etc.), and the capacity plan can include an aggregate of the containers (e.g., the individual exchanges of the different containers and/or aggregate values of the exchanges within each respective container). For example, a capacity plan containing ten containers may be assigned identifiers. For example, the capacity plan may be assigned identifiers according to Table 1:

TABLE 1

| Ledger |
|---|
| CP--1234--container-001 |
| CP--1234--container-002 |
| CP--1234--container-003 |
| CP--1234--container-004 |
| CP--1234--container-005 |
| CP--1234--container-006 |
| CP--1234--container-007 |
| CP--1234--container-008 |
| CP--1234--container-009 |
| CP--1234--container-010 |

As shown, with this naming convention other circuits and systems described herein (e.g., exchange modeler 122, capacity modeler 120, and analysis system 125) can request or query the ledger 117 according to the naming convention. For example, the requests and queries can include requests for exchanges including exchange data (sometimes referred to as "exchange information"). In some implementations, the ledger 117 (or exchange modeler 120 querying the ledger 117) can store a plurality of exchanges based on one or more data structures according to Table 2:

TABLE 2

| CP--1234--container-001 |
|---|
| Exchange-1: Exchange-Data |
| Exchange-2: Exchange-Data |
| Exchange-3: Exchange-Data |
| Exchange-4: Exchange-Data |
| Exchange-5: Exchange-Data |
| Exchange-6: Exchange-Data |

In some implementations, the ledger 117 may include a master ledger containing all exchanges. The exchanges can be routed to the master ledger and one or more fields of the received exchange can be updated to include an identifier according to Table 3:

TABLE 3

| Ledger |
|---|
| Exchange-1 (CP--1234--container-001): Exchange-Information |
| Exchange-2 (CP--1234--container-002): Exchange-Information |
| Exchange-3 (CP--1234--container-003): Exchange-Information |
| Exchange-4 (CP--1234--container-004): Exchange-Information |
| Exchange-5 (CP--1234--container-005): Exchange-Information |
| Exchange-6 (CP--1234--container-006): Exchange-Information |

For example, the exchange modeler 120 may receive exchange data for an exchange and apply one or more control structures to the exchange data to identify a container to which to route the exchange. Exchange modeler 120 can identify the container and an identifier for the container. Exchange modeler 120 can add the exchange data for the exchange to the ledger 117 (e.g., add a new line or record containing the exchange data to the ledger 117). Exchange modeler 120 can insert the identifier for the identified container in the line or record for the exchange in the ledger 117 to label or tag the exchange with the container and indicate which container the exchange is linked to or a part of. A sub-ledger for each container may be the exchanges that have been labeled with an identifier for the respective container. The exchanges may be retrieved and updated by querying the labels or tags that correspond to the individual containers. Accordingly, when updating the exchanges, analysis system 125 or data manager 124 may not need to individually determine which configuration parameters to apply to each individual exchanges and instead may apply the configuration parameters that correspond to the different containers, substantially reducing the processing resources that may be needed to search and update (e.g., broadcast) exchanges on the ledger.

In some implementations, exchanges for separate containers may be stored in sub-ledgers separated from the ledger 117. The sub-ledgers may each correspond to a respective container. For example, after or when routing an exchange to a particular container, exchange modeler 120 may insert the data for the exchange in an entry in a separate data structure from the ledger 117 that corresponds to the container. The exchange modeler 120 may separately route exchanges into different sub-ledgers in this way over time. The data manager 124 or the analysis system 125 may calculate aggregate values for the different sub-ledgers and input the aggregate values into the ledger 117 and do so over time based on configuration parameters of the individual containers. The analysis system 125 or the data manager 124 may then update the capacity plan of the ledger 117 based on the aggregate values (e.g., subtract the aggregated value from the capacity plan to calculate a remaining amount for the capacity plan).

The ledger 117 may assign one or more tags (e.g., array of tags) to each container based on the content of the exchanges in or linked to the containers. The tags can be used to enable users utilizing a graphical interface, the data manager 124, or other systems and devices described herein to enable searching (e.g., utilizing attributes, such as status) for exchanges or content of each container or a plurality of containers. For example, one tag can indicate the status of a particular container and can be updated in real-time by the ledger 117 or analysis system 125. In another example, one tag can indicate the balance of a particular container and can be updated in real-time by the ledger 117 analysis system 125. In yet another example, one tag can indicate the number of exchanges of a particular container and can be updated in real-time by the ledger 117 or analysis system 125. In these examples, the data manager 124 or analysis system 125 can execute calculations such as grouping of exchanges by tag on a per container basis or calculating balances on a particular date. Thus, each container can include a plurality of tags unique to the container. Therefore, the plurality of containers improves resource utilization by reducing search time and traversals associated with locating an exchange on a typical pooling exchange. Additionally, the generating and utilization of containers and identifiers unique to a particular sub-ledger in the ledger 117 provide improvements to ledger architectures by increasing access speed to systems and devices.

The memory 116 may store a capacity plan database 118, according to some embodiments. The capacity plan database 118 may store capacity plans, configuration parameters, and control structures. In some implementations, the capacity plan includes a plurality of containers and a plurality of configuration parameters corresponding to each specific container. For example, configuration parameters of a container can include a balance, an interest rate, a charge method, a credit limit, an identifier, and/or a primary account Boolean.

The memory 116 may store a third-party database 119, according to some embodiments. The third-party database 119 may store updated personal information for customer accounts associated with the third-party (e.g., the FI). For example, the third-party database 119 saves personal customer information, such as name, age, gender, address, education, occupation, etc., customer preferences, such as notification preferences, security preferences, etc., and authentication information, such as customer passwords, biometric data for the customer, geometric information (e.g., latitude, longitude), etc. The third-party database 119 may further be configured to store financial data for each customer account of the third-party, such as past exchanges or transactions, different third-party account information (e.g., balances, debt, type of account, etc.), investments, securities, loans, mortgages, other services offered by the third-party, etc.

Referring to the exchange modeler 120 generally. The exchange modeler 120 can receive data (e.g., environmental data, exchange data, third-party data, ledger data) from a plurality of data sources (e.g., ledger 117, capacity plan database 118, third-party database 119, user devices 140, third-party system 150, data sources 160, content management system 170) via one or more data channels (e.g., over network 130). Each data channel may include a network connection (e.g., wired, wireless, cloud) between the data sources and the system (e.g., 110, 150, 170). The plurality of data can include, but is not limited to, environmental data (e.g., IP addresses, ledger information, environmental information (e.g., geolocation, sensor data) associated with the exchange data, and so on), additional exchange data (e.g., amount, exchange history, interest rate, payment calculations, balances, etc.), and ledger data (e.g., container information, sub-ledger records), and so on. For example, the exchange modeler 120 can receive exchange data from a third-party system 150 and, in turn, assign or route the exchange to a sub-ledger associated with a particular container of a capacity plan. In the following example, the particular container can include a plurality of configuration parameters for determining how the exchange (e.g., the draw, or the swipe or any other mode of exchange) is handled.

Assigning or routing can include accessing, by the exchange modeler 120, the ledger 117 and executing one or more control structures to determine a particular sub-ledger of ledger 117 to store the newly received exchange. For example, the exchange modeler 120 can access the capacity plan database 118 based on submitting an API request for one or more control structures, and in turn execute the one or more control structures to determine a designated container to store the new exchange. In the following example, upon determining the container, the exchange modeler 120 can access the ledger 117 to determine the appropriate sub-ledger associated with the container to query and/or store the new exchange. In some implementations, prior to storing the exchange the ledger 117 can update the exchange data to include an exchange identifier.

The exchange modeler 120 can generate various data structures stored in the provider system 120. For example, the modeler 120 can be configured to generate one or more control structures including one or more rules datasets for routing received exchanges to a sub-ledger of ledger 117. The control structure may be a data structure executable instructions stored in memory 116. In general, the executable instructions can include instructions to analyze exchanges (including the exchange data) and select a "direction" or "route" in which to go based on applying rules of the rules datasets. In some implementations, the rules can be set by the user such that the user may customize desired routes of a particular exchange (e.g., via graphical information such as shown and described with reference to FIGS. 6A-6T). In various implementations, the exchange modeler 120 can generate rules (storing in a rules dataset) based on historical exchange information, user information (e.g., tendencies, geolocation, biometrics) of a particular user, user information of a plurality of users, etc. Accordingly, control structures can control the flow of received exchanges based on one or more rules. In particular, controlling the flow can include executing one or more instructions of the control structure to determine a sub-ledger associated with a container, and storing the exchange including updating one or more fields of the exchange to include an identifier. In some implementations, the executable instruction of a control structure can implement one or more flows of control including, but not limited to, sequential logic (sequential flow), selection logic (conditional flow) (e.g., sign alternative logic, double alternative logic, multiple alternative logic), iteration logic (repetitive flow). The exchange modeler 120 can also receive data that can be used in performing exchanges and/or updating capacity plans and containers. For example, exchange modeler 120 can be configured to receive exchange data from one or more systems and/or devices described herein.

A received exchange may be modeled by executing a plurality of control structures (e.g., applying rules of the rules datasets to data received for an exchange). In general, modeling an exchange is the process of determining a relationship between the exchange and one or more containers. The determining of the relationship of the exchange can include using or otherwise considering exchange data such as, but not limited to, date, time, geolocation, merchant, merchant attributes, merchant classification, merchant categorization, payment form, authorization method, authorizer, etc. to determine at least one relationship to a container of the ledger 117. Modeling can include determining that relationship based on executing the plurality of control structures. In particular, the control structures can include a rules dataset (e.g., variables) that can characterize the relationship between a particular exchange and a particular container. In doing so, the exchange modeler 120 can determine the sub-ledger of ledger 117 to which the exchange is broadcast. The exchange modeler 120 can process exchanges received and may perform various actions and/or access various types of data, some of which may be provided over network 130. In general, processing an exchange can include modeling the exchange by executing one or more control structures based on the context of the exchange. The context of the exchange can include exchange data (e.g., payment method, amount, date, time, MCC code), environmental data (e.g., real-time sensor information at the merchant, such as from the point-of-sale (POS) computing system or from the user device 140), activity data (e.g., previous locations of the customer, previous exchanges of the customer). In particular, the exchange modeler 120 can be configured to process exchanges based on received exchange data, additional exchange data, capacity plans, capacity plan attributes (e.g., configuration parameters and control structures, historical information) customer attributes (e.g., location, merchant, credit limit, current balance, biometric information) from the systems and devices described herein. Processing exchanges can include executing one or more control structures.

In some implementations, the control structures can be linked or associated with a particular container of a capacity plan, such that each sub-ledger is restricted by the control structure of the particular container. In various implementations, the control structures can be linked or associated with a capacity plan (e.g., a value), such that each exchange is modeled and routed to an appropriate sub-ledger by the control structure. For example, each capacity plan may have a plurality of control structure unique to the capacity plan that can be executed upon receiving an exchange. In particular, each capacity plan can be owned or administrated by a user and each user may configure different rules stored in the rules dataset for routing exchanges to containers, and the different rules can be executed by different control structures. Additionally, each capacity plan may include a plurality of different containers. Accordingly, each capacity plan may have a unique group of control structures for routing exchanges particular to the capacity plan.

Accordingly, when an exchange or exchange data is received, the exchange modeler 120 may communicate or broadcast a command to the ledger 117, updating the sub-ledger associated with a capacity plan (e.g., adjusting a value stored in the sub-ledger). For example, updating the sub-ledger can include storing an exchange including exchange data and an exchange identifier into a particular sub-ledger. In various arrangements, each command can include program code (e.g., a script, an executable) that, when executed by the ledger 117, causes the control structure to execute a specific set of instructions. In terms of conflict handling and/or the prioritization of two control structures (for different buckets), a routing priority can be determined by the modeler 120 or accessed in the third-party database 119 based on a user designation of priority. Accordingly, when control structures conflict and have a mutually exclusive categorization on a container, the priority order can be used to determine which container the exchange will be routed to. In some implementations, if no control structure categorizes the exchange, the exchange can be routed to a remainder container.

For example, a first control structure can route an exchange to a first container based on the specific type of vendor (e.g., restaurant, travel, groceries, health and wellness, food, and drink, personal, shopping, gas, entertainment, education, home, etc.) from which it is received. In another example, a second control structure can route an exchange to a second container based on the value relative to a designated price (e.g., greater than or equal to $100, less than or equal to $10, greater than or equal to $1,500, less than or equal to two Bitcoin, etc.). In yet another example, a third control structure can route an exchange to a third container based on exchange data (e.g., time of day, zip code, MCC code). In yet another example, a fourth control structure can route an exchange to a fourth container based on the date (e.g., customer's birthday, holiday, particular day of the week). In yet another example, a fifth control structure can route an exchange to a fifth container based on the merchant or vendor (e.g., Merchant A, Merchant B, Vendor C). In yet another example, when a sixth control structure and a seventh control structure both categorize an exchange to different containers based on different rules, a routing priority can be accessed and/or assessed by the exchange modeler 120 to determine the sixth control structure takes priority over the seventh control structure, and accordingly the exchange can be routed to a sixth container rather than a seventh container. As such, it should be understood control structure implementations can utilize a combination of data from various data sources. For example, an eighth data structure can route an exchange to the first container based on a combination of merchant data, exchange amount, customer date of birth, and balance on the capacity plan.

The capacity modeler 122 implements capacity plan generation operations of the provider system 110. In various implementations, the capacity modeler 122 can be configured to receive a plurality of data from a plurality of data sources (e.g., the data manager 124, the memory 116, the user devices 140, the third-party systems 150, the data sources 160, the content management system 170) via one or more data channels (e.g., over the network 130). Each data channel may include a network connection (e.g., wired, wireless, cloud) between the data sources and the provider system 110. For example, the capacity modeler 122 could receive customer data from the third-party system 150. In another example, the capacity modeler 122 could receive geolocation data from a user device (e.g., user devices 140) indicating a current location of a user associated with a capacity plan (e.g., at a restaurant and the capacity plan including a container for exchanges made at the restaurant).

Capacity modeler 122 can generate capacity plans including containers based on configuration parameters set by a customer or third-party (e.g., FI). In particular, capacity plans can be generated including various containers that are restricted to exchanges by control structures. In some implementations, the containers and configuration parameters of particular containers may be generated based on various factors, including, but not limited to, user factors (e.g., such as age, life event, history, location, credit score), third-party factors (e.g., loans offered, promotions offered, interest rates offered, payment flexibility offered), capacity plan status (e.g., all payments up-to-date, credit limit almost reached, interest rate changing, etc.), and so on. Accordingly, each capacity plan and the containers stored within may have a unique capacity model with unique configuration parameters. Accordingly, as containers and capacity plans are generated by the capacity modeler 122 based on a capacity model, they can be immediately (e.g., in real-time) group exchanges to a particular container based on the configuration parameters and control structures of the particular capacity plan.

In various implementations, the capacity modeler 122 can adjust configuration parameters of one or more containers or to a capacity plan generally. For example, the configuration parameters than can be adjusted (or change) can include, but not be limited to, billing cycle dates, balances, available credit, interest rate or charges, minimum payment, future minimum payment, past due, waterfall application, CARD Act payoff payment-fixed, CARD Act payoff term-fixed, draw expiration date, interest rounding, credit limit, payment type, fees, interest, and so on. Thus, the capacity modeler 122 can set configuration parameters that the third-party (and sometimes the user) can change. In particular, containers can be built over time (e.g., increase or decrease configuration parameters) based on some or all exchange data, environmental data, activity data, or third-party data of a third-party system 150 or user device 140, and the third-party or user can customize configuration parameters in real-time as exchange are routed and broadcast to sub-ledgers based on the control structures.

The data manager 124 can store various data structures in the memory 116. For example, the data manager 124 can store one or more configuration parameters or control structures. The configuration parameters and control structures may be a data structure included in the capacity plan database 124 and can be associated with a capacity plan. The data manager 124 can receive exchange data for each of the capacity plans. For example, for a particular capacity plan, the capacity plan may have five containers that each include a plurality of configuration parameters. The data manager 124 can be configured to receive the exchange data (e.g., from user devices 140 or third-party system 150) of one or more capacity plans. Based on the one or more control structures of a capacity plan, the exchange data can be routed and broadcast (grouped) into a sub-ledger of ledger 117 by the data manager 124. In some embodiments, the data manager 124 can receive exchange data for the capacity plan as a whole (e.g., stored capacity plan database 118) instead of exchange data specific to a particular container. For example, the exchange data can include a plurality of exchanges that can be routed and broadcast (e.g., by exchange modeler 120). The exchange data that the data manager 124 receives can be exchange data from third-party system 150. For example, upon a predetermined time period (or in real-time) the third-party system 150 can transmit packets of exchange data for a plurality of exchanges. In some implementations, the data manager 124 can communicate with content management system 170 via network 130 in order to present capacity plan information in real-time (or near real-time).

The analysis system 125 can receive calculation requests from other systems described herein (e.g., exchange modeler 120, capacity modeler 122, data manager 124, third-party systems 150, etc.) to execute one or more calculation functions on a capacity plan or container. Each calculation request can include a data payload. The data payload can be in a format such as, but not limited to JSON format, Real-time Transport Protocol (RTP) format, HTTP format, etc. The data payload can include arguments (e.g., actions, context, date, setup, transaction), in a particular structure. For example, arguments in a particular structure can be: {" actions": ["loc/billing-cycle-dates", "loc/balances"], "context": [ . . . ], "date": [ . . . ], "setup":[ . . . ], "transactions": [ . . . ]}. Accordingly, the one or more calculation functions can be executed based on the data payload indicating one or more actions, and each action can have a plurality of arguments (e.g., context, date, setup, transactions). Upon receiving a calculation request including an action, the analysis system 125 can request or query (e.g., executing API calls with an API, where the API calls return the requested or queried information) the memory 116 to process the request to generate an output. In some implementations, the analysis system 125 can be stateless such that it has no records of previous interactions and calculations, and each calculation can be handled based on entirely on information that comes from the calculation request. In particular, stateless or stateful can be derived from the implementation of states as a set of conditions at a moment in time. In some implementations, an output can be generated based on the calculation request and the output can be transmitted to the system or device that submitted the calculation request.

For example, upon receiving a "billing-cycle-dates" action, the analysis system 125 can query the capacity plan database 118 for all billing cycle dates of a particular container of a capacity plan. In the following example, the analysis system 125 can receive a API call return and can format an output to the system or device that submitted the calculation request. The output can include: {"current-billing-cycle": {"start-date": <date>, "end-date": <date>, "due-date": <date>} "next-billing-cycle": {"start-date": <date>, "end-date": <date>, "due-date": <date>} 1. For example, upon receiving a "balance" action, the analysis system 125 can query a particular sub-ledger of ledger 117 for aggregate balances of containers (e.g., container-id-1, container-id-2). In the following example, the analysis system 125 can receive a API call return and can format an output to the system or device that submitted the calculation request. The output can include: rbalances": 1" container-id-1": 1" balance": <rational>, "fees": <non-neg rational>, "interest-charges": <non-neg rational>, "interest-bearing-amount": <non-neg rational>, "payments-and-credits": <non-neg rational>, "swipes": <non-neg rational>, "keep-accruing-interest?": <boolean>, "container-id-2": { . . . }, "totals": {"balance": <rational>, "fees": <non-neg rational>, "interest-charges": <non-neg rational>, "interest-bearing-amount": <non-neg rational>, "payments-and-credits": <non-neg rational>, "swipes": <non-neg rational>}, "abated-swipes": [<transaction-1>, <transaction-2>, . . . ], "past-fees": Vtransaction-1>, <transaction-2>, In another example, additional actions can be received such as, but not limited to, available credit action, interest charge action, minimum payment action, future minimum payment action, past due action, waterfall application action, CARD act payoff payment-fixed action, and so on.

The analysis system 125 can also include updating sub-ledgers of the ledger 117 and/or specific exchanges on a sub-ledger. In some implementations, the analysis system 125 can query the ledger 117 for particular exchanges based on a calculation parameter(s) such as a date or date range, exchange amount, tag or a plurality of tags, a particular interest rate, a particular sub-ledger(s), and so on. The calculation parameter can be received from a user or third-party (e.g., interacting with GUI 600) or can be periodically performed by the analysis system 125 based on a schedule (e.g., every 2 minutes, every 1 hour, every Tuesday, every month). The query can return the exchanges satisfying the calculation parameter (or calculation parameters). In response to the return exchanges, the analysis system 125 can retrieve and/or identify (e.g., utilizing the identifier of the exchange such as, "Exchange-1 (CP—1234—container-001): Exchange-Information", "Exchange-2 (CP—6542—container-005): Exchange-Information", "Exchange-3 (CP—3421—container-090): Exchange-Information") the configuration parameters of a particular container of a capacity plan for each exchange. In some implementations, in response to retrieving and/or identifying the configuration parameters, the analysis system 125 can apply the configuration parameters to the particular exchange in the sub-ledger. For example, the configuration parameters can include a 5% interest rate and an update payment due date. The analysis system 125 can calculate and apply the interest rate to the particular exchange (e.g., apply 10% interest rate to $10, with a new balance of $11). In the following example, the analysis system 125 can update the balance and payment due date of the particular exchange on a sub-ledger. In general, the calculating interest each billing cycle is completed by aggregating the interest from each container, with awareness of each of their own configuration parameters. Thus, if one container is having interest abated at an exchange level for 90 days for each exchange starting on the exchange start date, and then afterwards if there is still an outstanding balance in that container on that exchange then the analysis system 125 can apply a 10% interest rate. On another container the configuration parameters include charging a 9% interest but not charge it until the individual carries a balance forward past a due date, or other various financial settings. Accordingly, then the analysis system 125 can collect all the mentioned information, aggregate it from each container and keep track in the memory 117 how the interest was calculated (e.g., a log of interest calculations).

In another example, the configuration parameters can include an interest rate accrued based on a sub-ledger per billing cycle. In the following example, the analysis system 125 can calculate and apply the interest rate to each sub-ledger per billing cycle, where a new exchange on each sub-ledger can be created with the applied interest rate. In another example, the configuration parameters can include a next due date and interest abated by exchange schedule. In the following example, the analysis system 125 can calculate the next due date and interest abated. In another example, the configuration parameters can include a billing cycle date, interest bearing balance (e.g., per sub-ledger), minimum due, and delinquency amount of days (e.g., days past due and amount past due). In the following example, the analysis system 125 can calculate each of the following configuration parameters based on querying the ledger 117 and access various data stored in memory 116 and/or other systems and devices described herein (e.g., user device 140, third-party system 150, data sources 160, content management system 170).

In various implementations, in response to retrieving and/or identifying the configuration parameters, the analysis system 125 can apply the configuration parameters to the particular sub-ledger. For example, the sub-ledger may have a balance and credit limit, and the analysis system 125 can apply an interest to one or more exchanges which in turn can include updating the balance of the sub-ledger. As such, it should be understood that the sub-ledger or exchange can be updated individually (e.g., in isolation) or can be collectively updated (e.g., when a balance on an exchange is updated, the sub-ledger balance is also updated).

In another example of updating exchanges, the analysis system 125 can query the ledger 117 for exchanges of individual containers. For example, the analysis system 125 can query the ledger 117 for a container A that corresponds to configuration parameters XYZ. The analysis system 125 may query the ledger 117 using "A" as an index value and retrieve ever exchange that is labeled or tagged with the label or tag A. Responsive to retrieving the exchanges linked to the A container, the analysis system 125 can identify the configuration parameters XYZ that correspond to container A and apply the configuration parameters XYZ to each of the retrieved exchanges to update the exchanges. The analysis system 125 can update the ledger 117 with the updated exchanges by either inserting new entries for the updated exchanges into the ledger 117 or updating (e.g., replacing) the corresponding exchanges in the ledger 117 with the updated exchanges. The analysis system 125 may similarly update the exchanges for different containers over time to update the ledger 117. Accordingly, the analysis system 125 may maintain an up-to-date ledger 117 while minimizing the querying processing requirements to do so.

Still referring to FIG. 1, the input/output interface (or circuit) 126 is structured to receive communications from and provide communications to third-parties and third-party customers associated with the provider system 110. The input/output interface 126 is structured to exchange data, communications, instructions, etc., with an input/output component of the provider system 110. In one embodiment, the input/output interface 126 includes communication circuitry for facilitating the exchange of data, values, messages, and the like between the input/output interface 126 and the components of the provider system 110. In yet another embodiment, the input/output interface 126 includes machine-readable media for facilitating the exchange of information between the input/output interface 126 and the components of the provider system 110. In yet another embodiment, the input/output interface 126 includes any combination of hardware components, communication circuitry, and machine-readable media.

In some embodiments, the input/output interface 126 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output interface 126 may provide an interface for the user to interact with various applications stored on the provider system 110. For example, the input/output interface 126 includes a keyboard, keypad, mouse, joystick, touch screen, microphone, biometric device, virtual reality headset, smart glasses, smart headset, and the like. As another example, input/output interface 126, may include, but is not limited to, a television monitor, computer monitor, printer, facsimile machine, speaker, and so on. As used herein, virtual reality, augmented reality, and mixed reality may each be used interchangeably yet refer to any kind of extended reality.

In general, one or more third-party systems 150 may be used by a third-party with a relationship to a user (e.g., provider, vendor, supplier, business partner, and so on) to perform various actions and/or access various types of data, some of which may be provided over network 130. A "third-party" as used herein may refer to an individual operating one or more third-party systems 150, interacting with resources or data via the third-party systems 150. The third-party systems 150 may be used to electronically transmit data (e.g., third-party data) to the user devices 140, and/or provider system 110, to access websites (e.g., using a browser), supply services, supply products, and to receive and/or transmit other types of data. In various implementations, the application 142 of user device 140 may be provided by third-party system 150. For example, a bank that offers loans may have an application form (e.g., 142) that is downloadable onto a mobile phone (e.g., 140). In some implementations, the provider system 110 can be integrated (or embedded) into a third-party application (e.g., application 142 downloaded by user device 140) such that API calls can be executed to provide capacity plans, configuration parameters and controls structures to users associated with the third-party of the third-party system 150. In various implementations, integration can include communicating over network 130 with a host process (e.g., of the third-party systems) via an API and/or an interface that is embedded into the host's webservice or application. Once integrated, the third-party application can collect environmental data, present real-time capacity plans, provide configuration parameters (including one or more terms), provide control structures (including one or more rules datasets) and/or other functionality described herein associated with the provider system 110.

The third-party system 150 may be managed by a provider, such as a credit card issuer, a financial institution, consultant, retailer, service provider and/or the like. The third-party system 150 similarly includes a processing circuit 152, a processor 154, memory 155, an input/output interface 158 and a network interface 159. The processing circuit 152, processor 154, memory 155, input/output interface 158 and the network interface 159 may function substantially similar to and include the same or similar components as the components of provider system 110, such as the processing circuit 112, processor 114, memory 116, input/output interface 126 and network interface 128, described above. As such, it should be understood that the processing circuit 112, processor 114, memory 116, input/output interface 126, and network interface 128 of the provider system 110 described above may be similarly applied to the processing circuit 152, processor 152, the memory 155, input/output interface 158 and network interface 159 of the third-party system 150.

For example, the network interface 159 is similarly structured and used to establish connections with other computing systems (e.g., the provider system 110, user devices 140, data sources 160 and content management system 170) via the network 130. The network interface 159 may further include any or all of the components discussed above, with reference to the network interface 128.

The processing circuit 152 similarly includes a processor 154 and a memory 155. The processor 154 and the memory 155 are substantially similar to the processor 114 and the memory 116 described above, with reference to the provider system 110. In some embodiments, the memory 155 includes a customer database 156. The customer database 156 may be structured to store data concerning each customer of with the third-party (e.g., FI customer). In some embodiments, the customer database 156 may store data regarding identification information, bank account information, investments, securities, loans, mortgages, other services used by the customer of the third-party, an associated user device 140, credentials, and so forth, of a customer of the third-party associated with the third-party system 150. For example, the customer database 156 may save biometric information (e.g., a fingerprint scan, eye scan, voice memo, etc.) and a password (e.g., PIN, alphanumeric code, QR code, barcode, etc.) for each customer of the third-party. As another example, the customer database 156 stores security and data access rights for each customer that are utilized in conducting particular exchanges (e.g., credit card exchanges, loans, cryptocurrency exchanges, etc.) or updates (e.g., plan allocations, capacity plan updates, configuration parameters). Furthermore, the data stored in the customer database 156 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., capacity plan information, configuration parameters, account numbers, account balances, available credit, credit history, exchange histories, and so on) relating to the various users and associated third-party accounts.

The processing circuit 152 also is shown to include a third-party interface 157. In some embodiments, the third-party interface 157 can transmit and receive a plurality of data (e.g., environmental data, exchange data, activity data, ledger data) to and from a plurality of data sources (e.g., provider system 110, ledger 117, capacity plan database 118, third-party database 119, user devices 140, data sources 160, and content management system 170) via one or more data channels (e.g., over network 130). Each data channel may include a network connection (e.g., wired, wireless, cloud) between the data sources and the system (e.g., 140, 150, 170). For example, the third-party interface 157 can receive exchange data from a user device 140 (e.g., via application 142) and in turn, update the customer database 156. In some implementations, the exchange may be sent to the provider system 110. In various implementations, the user device 140 may send the exchange data in parallel to the third-party system 150 and the provider system 110. Additionally, the third-party interface 157 may provide an application to the user device 142. In some implementations, the application may be generated and presented by the content management system 170 based on source code and parameters provided by third-party system 150. Although the customer database 144 and third-party interface 157 are shown as being a part of the third-party system 150, these components may alternatively be a part of or integrated in the provider system 110.

The input/output interface 158 may function substantially similarly to and include the same or similar components as the input/output interface 126 described above, with reference to the provider system 110. Accordingly, it will be understood that the description of the input/output interface 126 described above may also be applied to the input/output interface 158 of the third-party system 150. As an example, the input/output interface 158 is similarly structured to receive communications from and provide communications to user devices 140 of customers.

Further with respect to the components of FIG. 1, a content management system 170 may be configured to generate content for displaying to users. The content can be selected from among various resources (e.g., webpages, applications). The content management system 170 is also structured to provide content (e.g., via a graphical user interface (GUI)) to the user devices 140 and/or third-party system 150, over the network 130) for display within a resource. For example, in various arrangements, a capacity plan dashboard may be integrated in an institution's application or provided via an Internet browser. The content from which the content management system 170 selects may be provided by the provider system 110 via the network 130 to one or more user devices 140. In some implementations, the content management system 170 may select content to be displayed on the user devices 140. In such implementations, the content management system 170 may determine content to be generated and published in one or more content interfaces of resources (e.g., webpages, applications).

The content management system 170 may include one or more systems (e.g., computer-readable instructions executable by a processor) and/or circuits (e.g., ASICs, Processor Memory combinations, logic circuits) configured to perform various functions of the content management system 170. The content management system 170 can be run or otherwise be executed on one or more processors of a computing device, such as those described below in FIG. 11. In some implementations, the systems may be or include an interface system 180 and an interface generator 182. It should be understood that various implementations may include more, fewer, or different systems relative to those illustrated in FIG. 1, and all such modifications are contemplated within the scope of the present disclosure.

The content management system 170 similarly includes a processing circuit 172, a processor 174, a memory 176, an input/output interface 186, and a network interface 188. The processing circuit 172, processor 174, memory 176, input/output interface 186 and network interface 188 may function substantially similar to and include the same or similar components as the components of provider system 110, such as the processing circuit 112, processor 114, memory 116, input/output interface 126 and network interface 128, described above. As such, it should be understood that the processing circuit 112, the processor 114, the memory 116, the input/output interface 126, and the network interface 128 of the provider system 110 provided above may be similarly applied to the processing circuit 172, the processor 174, the memory 176, the input/output interface 186, and the network interface 188 of the content management system 170.

For example, the network interface 188 is similarly structured and used to establish connections with other computing systems (e.g., the provider system 110, user devices 140, third-party systems 150 data sources 160) via the network 130. The network interface 188 may further include any or all of the components discussed above, with reference to the network interface 128.

The processing circuit 172 similarly includes a processor 174 and a memory 178. The processor 174 and the memory 176 are substantially similar to the processor 114 and the memory 116 described above, with reference to the provider system 110. In some embodiments, the memory 176 includes a content database 177. The content database 177 may be structured to store data concerning source code, data structures, and content of capacity plan dashboards. The content database 177 can include data structures for storing information such as system definitions for customized dashboards generated by the interface generator 182, animated or other content items, and/or additional information. The content database 177 can be part of the content management system 170, or a separate component that the content management system 170, interface system 180, and/or interface generator 182, can access via the network 130. The content database 177 can also be distributed throughout the computing environment 100 and provider system 110. For example, the content database 177 can include multiple databases associated with a specific third-party (e.g., third-party systems 150), and/or a specific user device (e.g., user devices 140). The content database 177 and/or the content management system 170 can use various APIs to perform database functions (e.g., managing data stored in content database 177). The APIs can include SQL, NoSQL, NewSQL, ODBC, and/or JDBC components.

The processing circuit 172 is also shown to include an interface system 180 and an interface generator 182. In some embodiments, the interface system 180 can be configured to provide one or more customized dashboards (e.g., stored in content database 177) to one or more computing devices (e.g., user devices 140, third-party systems 150 and/or the provider system 110) for presentation. That is, the provided customized dashboards can execute and/or be displayed at the computing devices described herein. In some arrangements, the customized dashboards can be provided within a web browser. In some arrangements, the customized dashboards can include PDF files. In some arrangements, the customized dashboards can be provided via email. According to various arrangements, the customized dashboards can be provided on-demand or as part of push notifications.

In various implementations, the interface system 180 executes operations to provide the customized dashboards to the user devices 140, third-party systems 150, and/or the provider system 110 without utilizing the web browser. In various arrangements, the interface system 180 (the customized dashboard) can be provided within an application (e.g., mobile or desktop application). The dashboard from which the content management system 170 generates (e.g., the interface generator 182) may be provided to one or more third-parties, via the network 130, to one or more third-party systems 150. In some arrangements, the content management system 170 may select capacity plan and specific container information to be displayed on the user devices 140.

In some embodiments, the interface system 180 can include both a client-side application and a server-side application. For example, the interface system 180 can be written in one or more general purpose programming languages and can be executed by user devices 140, third-party systems 150, and/or provider system 110. The server-side interface system 180 can be written, for example, in one or more general purpose programming languages, and can be executed by the provider system 110 and/or content management system 170.

The interface generator 182 can be configured to generate a plurality of customized dashboards and their properties. The interface generator 182 can generate customized user-interactive dashboards for one or more entities, such as the third-party systems 150, based on data received from provider system 110, any other computing device described herein, and/or any database described herein (e.g., 116, 155, 160). The generated dashboards can include various data (e.g., data stored in the content database 177, memory 155, and/or memory 116) associated with one or more capacity plans, containers, configuration parameters, and control structures.

The input/output interface 186 may function substantially similarly to and include the same or similar components as the input/output interface 126 described above, with reference to the provider system 110. Accordingly, it will be understood that the description of the input/output interface 126 described above may also be applied to the input/output interface 186 of the third-party system 150. As an example, the input/output interface 186 is similarly structured to receive communications from and provide communications to user devices 140 of customers.

The network 130 may include a local area network (LAN), wide area network (WAN), telephone network (such as the Public Switched Telephone Network (PSTN)), wireless link, intranet, the Internet, or combinations thereof. The provider system 110 and computing environment 100 can also include at least one data processing system or processing circuit, such as the provider system 110, user devices 140, third-party systems 150, multi-data sources 160 and/or the content management system 170. The provider system 110 can communicate via the network 130, for example with the user devices 140, the third-party systems 150, and/or the data sources 160.

The network 130 can enable communication between various nodes, such as the provider system 110 and user devices 140. In some implementations, data flows through the network 130 from a source node to a destination node as a flow of data packets (e.g., formed in accordance with the Open Systems Interconnection (OSI) layers). A flow of packets may use, for example, an OSI layer-4 transport protocol such as the User Datagram Protocol (UDP), Transmission Control Protocol (TCP) or Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system ("AS"), e.g., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of an intervening network (a transit network), dual-homed gateway node, point of presence (POP), Internet eXchange Point (IXP) and/or additional network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSMC), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the user devices 140) via a network interface (sometimes referred to as a network interface port). The network interface controller handles the physical and data link layers of the Open Systems Interconnection (OSI) model for network communication. In some implementations, some of the network interface controller's tasks are handled by one or more processing circuits. In various implementations, the network interface controller is incorporated into the one or more processing circuits, e.g., as circuitry on the same chip.

In some implementations, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various implementations, the network interface controller implements one or more network protocols, such as Ethernet. Generally, the provider system 110 can be configured to exchange data with other computing devices via physical or wireless links through a network interface. The network interface may link directly to another device or to another device via an intermediary device, e.g., a network device such as a hub, bridge, switch or router, connecting the provider system 110 to the network 130.

One or more user devices 140 (e.g., smartphones, tablets, computers, etc.) may be used by a user to perform various actions and/or access various types of content, some of which may be provided over a network 130 (e.g., the Internet, LAN, WAN, etc.). A "user" or "entity" as used herein may refer to an individual operating user devices 140, interacting with resources or content via the user devices 140, etc. The user devices 140 may be used to send data (e.g., activity data, environmental data) to the provider system 110 or may be used to access websites (e.g., using an Internet browser), the Internet (e.g., using a mobile application), media files, and/or any other types of content. In some implementations, the user devices 140 have enabled location services which can be tracked over the network 130. Locations services may use global positioning system (GPS) or other technologies to determine a location of the user devices 140.

The user device 140 (sometimes referred to herein as a "computing system") may be a mobile computing device, desktop computer, smartphone, tablet, smart watch, smart sensor or any other device configured to facilitate receiving, displaying and interacting with content (e.g., webpages, mobile applications, etc.). The user device 140 may include an application 142 to receive and display content and to receive user interactions with the content. For example, an application 142 may be a web browser. Additionally, or alternatively, the application 142 may be a mobile application.

User device 140 may also include an input/output circuit for communicating data over network 130 (e.g., receive and transmit to provider system 110 and/or third-party systems 150). In particular, the input/output circuit that is structured to send and receive communications over network 130 (e.g., with the provider system 110 and/or third-party systems 150). The input/output circuit is structured to exchange data (e.g., exchange data, capacity plan information, configuration parameters, control structures), communications, instructions, etc., with an input/output component of the various systems and devices described herein. In one implementation, the input/output circuit includes communication circuitry for facilitating the exchange of data, values, messages, and the like between the input/output circuit and the provider system 110 and/or third-party systems 150. In yet another implementation, the input/output circuit includes machine-readable media for facilitating the exchange of information between the input/output circuit and the provider system 110 and/or third-party systems 150. In yet another embodiment, the input/output circuit includes any combination of hardware components, communication circuitry, and machine-readable media.

In various implementations, the user device 140 can receive user input from a user (e.g., via sensors, or any other input/output devices/ports described herein). A user input can be a plurality of inputs, including, but not limited to, a gesture (e.g., a flick or a shake of user device 140, a user-defined custom input (e.g., utilizing an API), biological data (e.g., stress level, heart rate, hand geometry, facial geometry, psyche), and/or behavioral data (e.g., haptic feedback, gesture, speech pattern, movement pattern (e.g., hand, food, arm, facial, iris)), or combination thereof, etc. In some embodiments, one or more user inputs can be utilized to perform various actions on user device 140. For example, a user that performs an input may invoke a interface schemes for customizing one or more capacity plans, configuration parameters or control structures.

The application 142 may include a collection of software development tools contained in a package (e.g., software development kit (SDK), API, integrated development environment (IDE), debugger, etc.). For example, application 142 may include an application programming interface (API) configured for communication with provider system 110—in particular, the data manager 124. In another example, application 142 may include a debugger. In yet another example, application 142 may be an SDK that includes an API, a debugger, an IDE, and so on. In some implementations, application 142 includes one or more libraries having reusable functions that interface with a particular system software (e.g., iOS, Android, Linux, etc.). For example, application 142 can automatically transmit (e.g., via a secure connection) environmental data whenever an exchange associated with a capacity plan occurs. In various implementations, application 142 can be provided within an application (e.g., mobile application, desktop application). The application 142, from which the provider system 110 and/or third-party systems 150 hosts may be provided (e.g., downloaded, or via a webpage) to one or more user devices 140 (via the network 130).

In an example implementation, the application 142 can be executed (e.g., downloaded for a mobile-based application) and/or presented (e.g., via a website for a web-based application) by the user device 140 that can cause an application interface to be overlaid with a schemes interface on the user device 140. For example, the user may perform a gesture (e.g., input) and/or selection (e.g., from a selectable element or actionable object) on the user device 140 to invoke the application 142. In response, the application 142 may request data, such a capacity plan information, configuration parameters, third-party information, and/or control structure information stored in memory 116. For example, upon the request, the user device 140 may present configuration parameters for one or more containers of the capacity plan, and allow selection, in real-time, to make modifications to one or more configuration parameters (e.g., coverage change for a plan, credit limit change, rewards change, due date change, interest rate update, etc.)

In another example implementation, the application 142 being executed by the user device 140 can cause a web browser to the display the customized capacity plan. For example, the user may connect (e.g., via the network 130) to a website structured to host the customized capacity plan interface (e.g., GUI). The web browser operates by receiving input of a uniform resource locator (URL) into a field from an input device (e.g., a pointing device, keyboard, touchscreen, mobile phone, etc.). In response, application 142 executing the customized capacity plan interface in the web browser may request data such as all containers associated with the user or potential containers based on activity data (e.g., previous exchanges, financial history, etc.). The web browser may include other functionalities, such as navigational controls (e.g., backward, forward and home buttons). In some implementations, the customized capacity plan interface can include both a client-side interface and a server-side interface. For example, a client-side interface can be written in one or more general purpose programming languages and can be executed by user device 140. The server-side interface can be written, for example, in one or more general purpose programming languages and can be executed by the provider system 110.

In some implementations, the user devices 140 and/or third-party systems 150 have enabled location services which can be tracked over the network 130. Location services may use a GPS or other technologies to determine a location of the user devices 140 and/or third-party systems 150. In some implementations, location information can be used by the provider system 110 to generate containers, update configuration parameters, generate additional exchange data or process exchanges associated with a capacity plan. In some implementations, users of the application 142 may have various levels of access to perform operations and review information (e.g., restricted access, access containers, review containers, submit claims, modify containers, initiate containers, authorize payment). Using a unique credentials (e.g., username, password, security code) (generally referred to herein as an "account"), a user (e.g., internal, or external) may gain access to perform various operations and review various information. Permissions associated with a user can be used to determine which data a user may access. That is, permissions can be used to define the access level of each user. For example, a certain interface can be generated that is only accessible to the users having permission to initiate or modify containers. In some implementations, permissions can be user-specific and/or each user can have separate and distinct accounts.

The computing environment 100 can include a data acquisition engine 180. In various implementations, the provider system 110 can be communicatively and operatively coupled to the data acquisition engine 180. The data acquisition engine 180 can include one or more processing circuits configured to execute various instructions. In various implementations, the data acquisition engine 180 can be configured to facilitate communication (e.g., via network 130) between provider system 110, and systems and devices described herein (e.g., user devices 140, third-party systems 150, data sources 160, content management system 170). The facilitation of communication can be implemented as an API (e.g., REST API, Web API, customized API), batch files, SDK, and/or queries. In various implementations, the data acquisition engine 180 can also be configured to control access to resources of the provider system 110. The API can be used by the data acquisition engine 180 and/or computing systems to exchange data and make function calls in a structured format. The API may be configured to specify an appropriate communication protocol using a suitable electronic data interchange (EDI) standard or technology.

The data sources 160 can provide data to the provider system 110. In some implementations, the data sources 160 can be structured to collect data from other devices on network 130 (e.g., user devices 140, third-party systems 150, content management system 170) and relay the collected data to the provider system 110. In one example, an entity may have a server and database (e.g., proxy, enterprise resource planning (ERP) system) that stores network information associated with the user and/or third-party. In this example, the provider system 110 may request data associated with specific data stored in the data source (e.g., data sources 160) associated with the user (e.g., exchange data, configuration parameter information, control structure information). For example, in some implementations, the data sources 160 can host or otherwise support a search or discovery engine for Internet-connected devices. The search or discovery engine may provide data, via the data acquisition engine 180, to the provider system 110.

The data sources 160 can provide data to the provider system 110 based on the data acquisition engine 180 scanning (e.g., monitoring) the Internet (e.g., various data sources and/or data feeds) for data associated with capacity plans. That is, the data acquisition engine 180 can hold (e.g., in non-transitory memory, in cache memory, and/or in the database 120) the executables for performing the scanning activities on the data sources 160. Further, the provider system 110 can initiate scanning operations. For example, the provider system 110 can initiate scanning operations by retrieving plan information or account information from database 120. As used herein, the terms "scan" and "scanning" refer to and encompass various data collection operations, which may include directly executing and/or causing to be executed any of the following operations: query(ies), search(es), web crawl(s), interface engine operation(s) (structured to enable the data acquisition engine 180 to enable an appropriate system interface to continuously or periodically receive inbound data), document search(es), dataset search(es), retrieval from internal systems of previously received data, etc. These operations can be executed on-demand and/or on a scheduled basis. In some embodiments, these operations include receiving data (e.g., exchange data, container data, capacity plan data, configuration parameters, control structures) in response to requesting the data (e.g., data "pull" operations). In some embodiments, these operations include receiving data without previously requesting the data (e.g., data "push" operations). In some embodiments, the data "push" operations are supported by the data acquisition engine 180.

In some implementations, scanning occurs in real-time such that the data acquisition engine 180 continuously scans (or collects) the data sources 160 for data associated with capacity plans in general and/or particular containers. In various implementations, scanning may occur in periodic increments such that the data acquisition engine 180 can scan the Internet for data associated with the specific user or third-party periodically (e.g., every minute, every hour, every day, every week, or any other increment of time.) In some embodiments, data acquisition engine 180 may receive feeds from various data aggregating systems that collect data associated with specific users. For example, the provider system 110 can receive specific user data from the data sources 160, via the network 130 and data acquisition engine 180. The information collected by the data acquisition engine 180 may be stored as data in or more of the databases (e.g., the capacity plan database 118, the third-party database 119) or ledgers (e.g., ledger 117).

Figure 2:
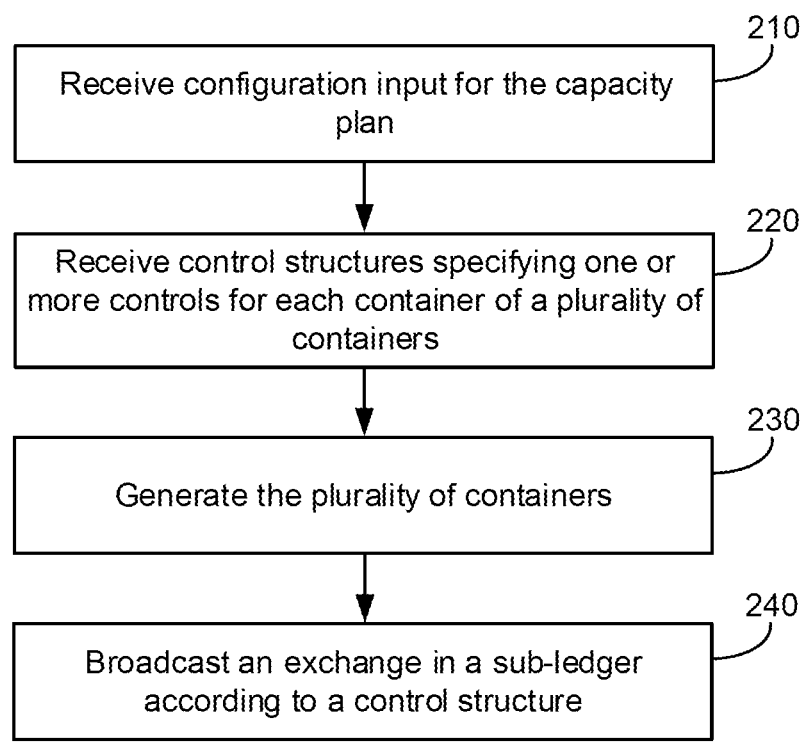
FIG. 2 is a flowchart of a method to provide a plurality of configuration parameters for individual exchanges included in a capacity plan, according to some implementations.

FIG. 2 is a flowchart of a method 200 to provide a plurality of configuration parameters for individual exchanges included in a capacity plan, according to some implementations. Provider system 110 can perform method 200. Further, any computing device described herein can be configured to perform method 200.

In broad overview of method 200, at block 210, the one or more processing circuits can receive configuration input for the capacity plan. At block 220, the one or more processing circuits can receive control structures specifying one or more controls for each container of a plurality of containers. At block 230, the one or more processing circuits can generate the plurality of containers. At block 240, the one or more processing circuits can broadcast an exchange in a sub-ledger according to a control structure. Additional, fewer or different operations may be performed depending on the particular arrangement. In some embodiments, some, or all operations of method 200 may be performed by one or more processors executing on one or more computing devices, systems or servers. In various embodiments, each operation may be re-ordered, added, removed or repeated.

At block 210, the one or more processing circuits can receive, via the communication network interface, configuration input for the capacity plan, the configuration input indicating the configuration parameters of each container of the plurality of containers. For example, the configuration input can include a plurality of terms for handling (e.g., updating) exchanges routed to a particular container.

At block 220, the one or more processing circuits can receive, via the communication network interface, control structures specifying one or more controls for each container of the plurality of containers, the control structures for a given container of the plurality of containers to be used to determine allocation of exchanges to the given container for handling according to the configuration parameters of the given container. In some implementations, the one or more processing circuits can generate the control structures specifying the one or more controls for each container of the plurality of containers, wherein each control structure of the control structures includes and executes one or more instructions determining the sub-ledger of the plurality of sub-ledgers to receive the broadcasted exchange.

At block 230, the one or more processing circuits can generate the plurality of containers to include the configuration parameters of each container of the plurality of containers. In some implementations, a plurality of containers can correspond to the capacity plan. In various implementations, each container of the plurality of containers can include configuration parameters specifying one or more aspects of handling an exchange (e.g., draw, such as withdrawal) included in the capacity plan. For example, a first container of the plurality of containers corresponds to a first control structure of the control structures, and a second container of the plurality of containers corresponds to a second control structure of the control structures. In the following example, the one or more instructions of each control structure restrict or allow the broadcasting of the exchange to one of the plurality of containers based on a rules dataset.

At block 240, the one or more processing circuits can receive exchange data for an exchange and broadcast the exchange in a sub-ledger of the plurality of sub-ledgers according to a control structure of the control structures of a corresponding container. For example, the exchange data can include exchange-specific data including, but not limited to, one or more of a merchant identifier, a date, a time, a geolocation, a merchant, a hash, or a cryptogram. In another example, the exchange data can include capacity-plan-specific exchange data including, but not limited to, one or more of a line of capacity limit, a plan product, a portfolio, a status, a balance, or a delinquency measure. In yet another example, the exchange data can include customer-specific exchange data including, but not limited to, one or more of a date of birth, a customer identifier (e.g., a customer name), a customer address, a geolocation, a zip code, a wallet identifier, or a public key. In some implementations, the one or more processing circuit can establish, utilizing a first application programming interface (API), a data feed associated with the exchange request. The data feed can be at least one of a credit card network, an exchange acquiring institution, or a merchant. In some implementations, the one or more processing circuit, in response to broadcasting the exchange in the sub-ledger of the plurality of sub-ledgers, update a second sub-ledger based on the exchange data and according to a second control structure of the control structures of a second corresponding container. In particular, the update to the second sub-ledger can include updating a sub-ledger to reconcile the exchange. For example, the second sub-ledger may be associated with a different user and the exchange may be between the user and the different user (e.g., if deposit is recorded in the first sub-ledger, then withdrawal is recorded in the second sub-ledger, if withdrawal is recorded in the first sub-ledger, then record a deposit in the second sub-ledger). In another example, a second sub-ledger may be updated if it is a universal sub-ledger that records all exchanges on all the sub-ledgers.

In some implementations, the one or more processing circuits can store, in memory, a ledger to broadcast exchanges associated with the capacity plan. The ledger can include a plurality of sub-ledgers each associated with a container of the plurality of containers. In some implementations, each exchange of the ledger is broadcasted within at least one sub-ledger of the plurality of sub-ledgers. For example, the one or more processing circuits can write an entry in a sub-ledger. In another example, the broadcasted exchange may be approved prior to being written into an entry in the sub-ledger. In some implementations, the one or more processing circuits can broadcast the exchange based on modelling the ledger by inputting the configuration parameters, exchange data, and/or the ledger including the plurality of sub-ledgers and generating an output prediction to the ledger, wherein the output prediction is a currency estimate or currency calculation associated with at least one container. Modeling the ledger can include training a model (e.g., artificial intelligence (AI), machine learning, neural network, linear regression, estimator) by the one or more processing circuits using previous exchanges that were routed based on exchange data and configuration parameters. The model can then be configured to receive configuration parameters and/or the ledger as input and output a prediction of the sub-ledger to broadcast the exchange to.

In some implementations, the one or more processing circuits can generate a statement of the capacity plan according to all exchanges broadcasted in the ledger and according to the plurality of configuration parameters and present, via a viewport (e.g., a display) of a user device, a graphical user interface (GUI) including the statement. In some implementations, the one or more processing circuits can generate the ledger according to the plurality of containers, wherein generating includes configuring the plurality of sub-ledgers associated with the plurality of containers based on the control structures. For example, upon the user or a third-party requesting a new capacity plan, the ledger can generate a plurality of sub-ledgers based on containers of the capacity plan. The generation of sub-ledgers can include generating one or more data structures and generating control structures based on received rules of the user or third-party or based on the one or more processing circuits generating rules. The ledger can include pointers to each of the sub-ledgers, and the ledger can point (using a pointer) to a root node, where the root node includes pointers to the plurality of ledgers stored in the ledger 117.

In some implementations, the one or more processing circuits can determine global configuration parameters of the plurality of containers, wherein the global configuration parameters include an aggregate of the configuration parameters of each of the plurality of containers. In particular, the global configuration parameters can be an aggregate of the configuration parameters of the plurality of containers. For example, the credit limit (e.g., a configuration parameter) on container A may be $5,000 and the credit limit on container B may be $2,500. In the following example, a global configuration parameter may be an aggregate credit limit of all the containers (e.g., $7,500).

In some implementations, the one or more processing circuits can generate, in real-time, one or more global estimates based on executing one or more functions calls with the control structures of each of the plurality of containers, wherein the one or more global estimates include at least one of a minimum threshold amount, a frequency, a response cycle (e.g., where a response can be a payment or exchange of currency), an end date cycle, a compliance rating. For example, a global estimate can be an estimate of a minimum threshold amount (or minimum payment amount) to satisfy a global configuration parameter of a container specific configuration. In another example, the global estimate can be any approximation associated with the current activity of a particular container or a plurality of containers. In some implementations, the third-party system 150 or user device 140 may request one or more global estimates.

Figure 3:
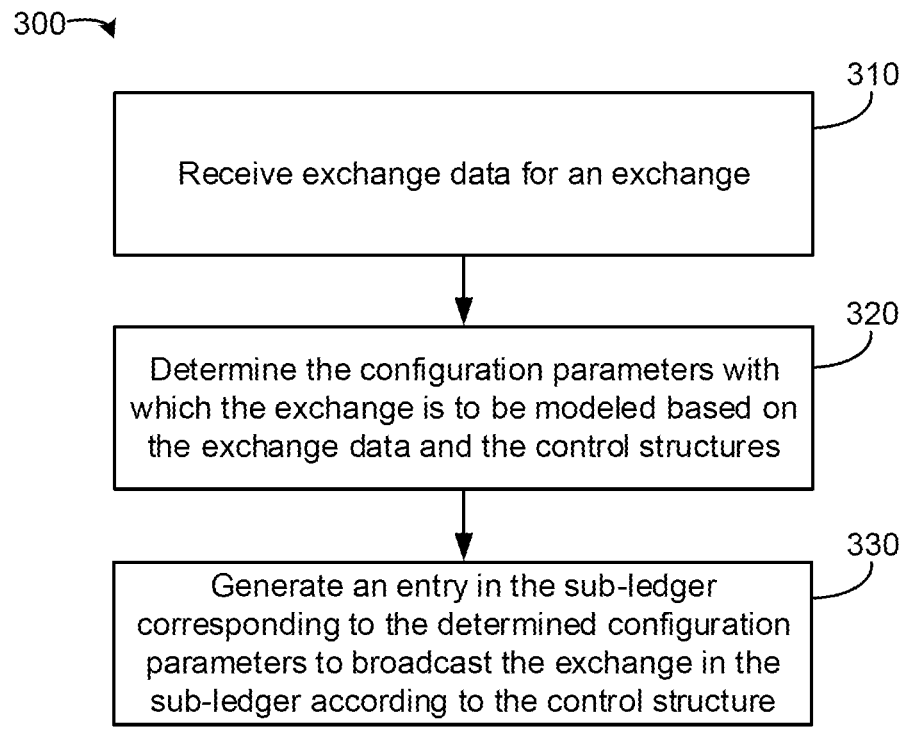
FIG. 3 is a flowchart of a method to model exchanges of a capacity plan with configuration parameters, according to some implementations.

FIG. 3 is a flowchart of a method 300 to model exchanges of a capacity plan with configuration parameters, according to some implementations. Provider system 110 can perform method 300. Further, any computing device described herein can be configured to perform method 300.

In broad overview of method 300, at block 310, the one or more processing circuits can receive exchange data for an exchange. At block 320, the one or more processing circuits can determine the configuration parameters with which the exchange is to be modeled based on the exchange data and the control structures. At block 330, the one or more processing circuits can generate an entry in the sub-ledger corresponding to the determined configuration parameters to broadcast the exchange in the sub-ledger according to the control structure. Additional, fewer or different operations may be performed depending on the particular arrangement. In some embodiments, some or all operations of method 300 may be performed by one or more processors executing on one or more computing devices, systems or servers. In various embodiments, each operation may be re-ordered, added, removed or repeated.

At block 310, the one or more processing circuits can receive, via the communication network interface, exchange data for an exchange. In some implementations, the one or more processing circuits can request or collect additional exchange data from a data source identified based on the exchange data. That is, the user device 140 or third-party system 150 may provide the exchange data for the exchange but the one or more processing circuits may request additional data from data sources 160. For example, the third-party system 150 may provide credit card information for the exchange but the one or more processing circuits may also need credit network information (e.g., rewards information, other card holders, credit score, etc.), and as such may request information from a credit card network (e.g., data source 160). The additional exchange data can be enriched with the exchange data based on aggregating the additional exchange data into the exchange data. For example, enriching can include removing duplicate information and aggregating the additional exchange data and exchange data into a new data structure or into the existing exchange data.

At block 320, the one or more processing circuits can determine the configuration parameters with which the exchange is to be modeled based on the exchange data and the control structures of the plurality of sub-ledgers. The control structures can include one or more instructions for modeling exchanges with the configuration parameters of a given sub-ledger of the plurality of sub-ledgers. In some implementations, determining the configuration parameters with which the exchange is to be modeled is further based on at least one of cross-referencing the exchange data with the control structure or applying the control structure to the exchange data. For example, the configuration parameters may be stored in memory of the one or more processing circuits. In the following example, the memory can be accessed to obtain the control structure including a rules dataset which can be cross-referenced with the exchange data. In some implementations, when multiple control structures conflict on which container to receive the exchange, a routing priority can be accessed or determined to determine which control structure is prioritized in routing the exchange to a particular container. In some implementations, determining the configuration parameters with which the exchange is to be modeled is based on inputting the exchange data and the control structure and generating an output prediction of the sub-ledger of the plurality of sub-ledgers to generate the entry in and broadcast the exchange to. Modeling the exchange can include training a model (e.g., artificial intelligence (AI), machine learning, neural network, linear regression, estimator) by the one or more processing circuits using previous exchanges that were routed based on exchange data and configuration parameters. The model can then be configured to receive configuration parameters and/or the exchange data as input and outputting a prediction of the sub-ledger to broadcast the exchange to.

At block 330, the one or more processing circuits can generate an entry in the sub-ledger corresponding to the determined configuration parameters to broadcast the exchange in the sub-ledger of the plurality of sub-ledgers according to the control structures of a corresponding container. A ledger can receive broadcasted exchanges associated with the capacity plan. In particular, a ledger can include a plurality of sub-ledgers each associated with a container of a plurality of containers such that each exchange of the ledger is broadcasted within a sub-ledger of the plurality of sub-ledgers. In some implementations, the one or more processing circuits can generate the ledger according to the plurality of containers, wherein generating includes configuring one or more sub-ledgers associated with the plurality of containers based on the control structures.

In some implementations and with reference to FIG. 2, the one or more processing circuits can determine global configuration parameters and generate, in real-time, one or more global estimates. In some implementations, the one or more processing circuit, in response to broadcasting the exchange in the sub-ledger of the plurality of sub-ledgers, update a second sub-ledger based on the exchange data and according to a second control structure of the control structures of a second corresponding container. In some implementations, the one or more processing circuit can establish, utilizing a first application programming interface (API), a data feed associated with the exchange request. The data feed can be at least one of a credit card network, an exchange acquiring institution, or a merchant.

Figure 4:
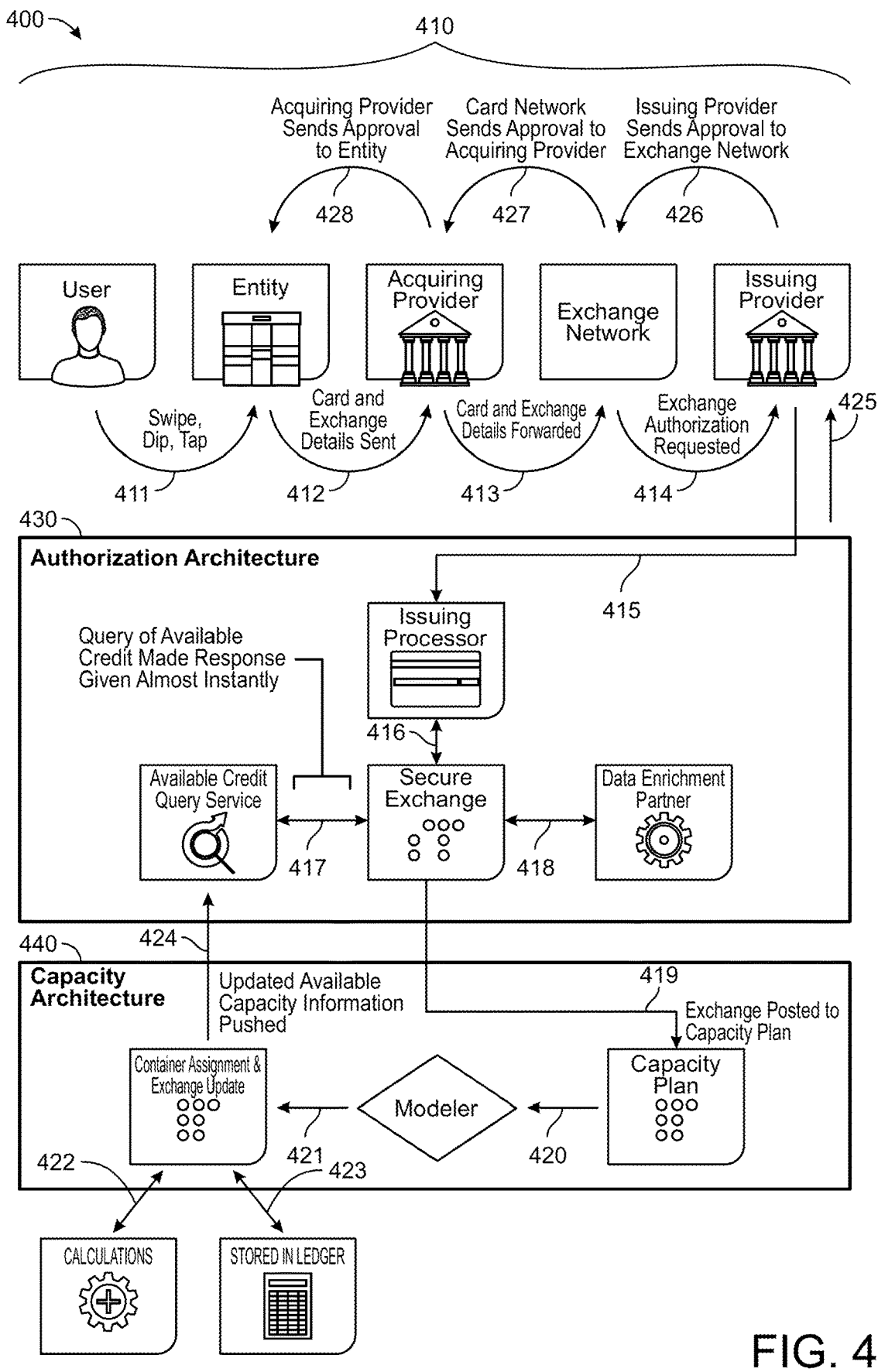
FIG. 4 is a system architecture for implementing a capacity plan, according to some implementations.

FIG. 4 is a capacity plan architecture 400, according to some implementations. In general, the capacity plan architecture 400 depicts the process of a user or customer performing an exchange and the provider system 110 (in particular, exchange modeler 120 and data manager 124) receiving exchange data from a provider for processing the exchange. Computing environment 410 depicts the process of exchanging information between the user, entity, providers and exchange networks. For example, at 411 the user can swipe, dip, tap or otherwise provide a payment form to an entity (e.g., merchant at a POS). At 412, the card and exchange details (or data) can be sent to an acquiring provider (e.g., acquiring FI). At 413, the acquiring provider can forward the card information (or other payment form) and exchange details to an exchange network, and at 414 the exchange network can request an exchange authorization (e.g., authorizing the exchange).

It will be understood that the description of the 415-425 described herein may be executed by provider system 110 and in particular, exchange modeler 120 and/or capacity modeler 122. In general, the authorization architecture 430 includes the pre-processing and post-processing of the exchange before or after the exchange is modeled by exchange modeler 120. Additionally, capacity architecture 440 can be implemented by capacity modeler 122 and received exchanges can be modeled by exchange modeler 120. At 415, the issuing provider can provide to the providing system 110 exchange data of an exchange. In some implementations, at 415, the provider system 110 can query the issuing provider on a periodic basis for new changes. At 416, the exchange and exchange data can be encrypted and/or a secure communication channel (e.g., secure socket layer (SSL), transport layer security (TLS), etc.) can be established between the issuing provider and provider system 110. At 417, the exchange data can be cross-referenced with an available credit query service to determine available credit (or other credit history) of a capacity plan or a particular container. At 418, the exchange data can be sent (e.g., securely) to a data source 160 to scrub and/or clean (e.g., fixing incorrect, incomplete, duplicate or otherwise erroneous data in the data set, detecting and correcting corrupt or inaccurate records from a record set, table, or database and by incomplete, incorrect, inaccurate, or irrelevant parts of the data and then replacing, modifying, or deleting the dirty or coarse data) the exchange data. In some implementations, the provider system 110 such as exchange modeler 120 can scrub or clean the exchange data.

At 419, the exchange can be posted or sent to the capacity plan (e.g., by capacity modeler 122). At 420, one or more control structures can be executed to determine the container to which the exchange is to be assigned (e.g., by exchange modeler 120). At 421, the exchange can be assigned to the container of the capacity plan (e.g., by exchange modeler 120). In some implementations, assignment of the exchange to a container can include updating (at 423) at least one filed of the exchange data and the exchange can be stored on a sub-ledger of ledger 117. In some implementations, assignment of the exchange to a container can additionally include sending one or more calculation requests (at 422) to the analysis system 125. For example, prior to assigning the exchange to a container, the output of the analysis system 125 can be used to model the exchange and broadcast the exchange to a particular sub-ledger. At 423, the assigning of an exchange to a container of a capacity plan can include logging information (e.g., including all updates to the ledger, sub-ledger, container, and any analysis performed) or a report indicating the updates that occurred. In some implementations, at 422, the analysis system 125 can query the ledger 117 for exchanges from one or containers using the identifiers of the containers. The analysis system 125 can apply the configuration parameters from the containers to the exchanges that correspond to the different containers to generate an updated exchange data. At 423, the analysis system 125 can update the ledger 117 by inserting the updated exchange data into the ledger 117 as new entries for each exchange or by replacing the exchanges in the ledger with the updated exchange data. At 424, the logging information or report can be provided to an available credit query service (e.g., third-party) indicating any updates that occurred (e.g., new credit limit, new balance, paid balance, late payment, settlements, etc.).

At 425, the issuing provider can be provided a response by exchange modeler 120. The response can include an indication the exchange was successfully recorded (e.g., an approval) in a ledger. At 426, the issuing provider sends approval to an exchange network. At 427, the card network can send an approval to the acquiring provider. At 428, the acquiring provider can send the approval to the entity (e.g., merchant, store, service provider, product provider).

Figure 5:
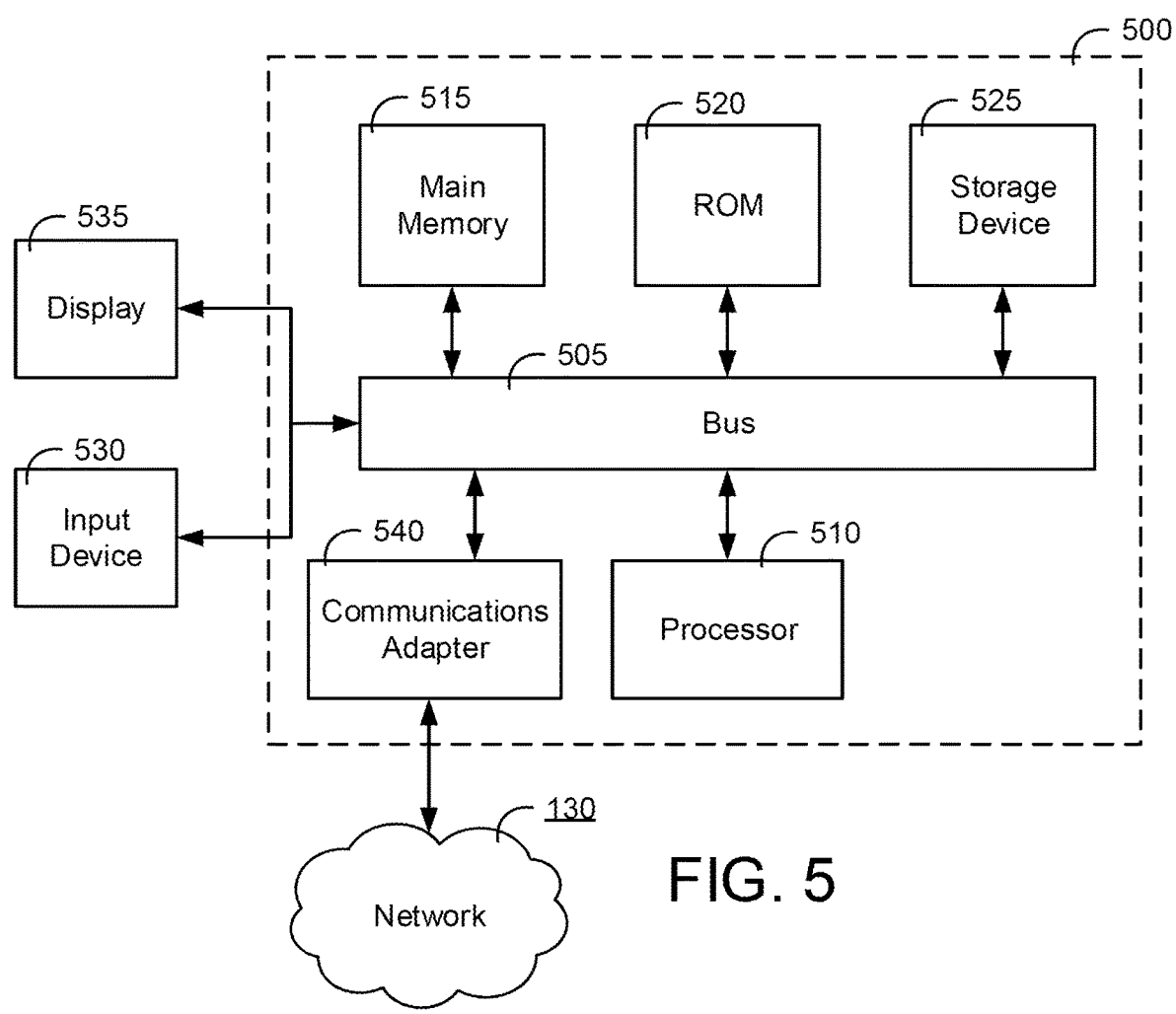
FIG. 5 is a block diagram illustrating an example computing system suitable for use in the various implementations described herein.

Referring now to FIG. 5, a depiction of a computer system 500 is shown. The computer system 500 can be used, for example, to implement a provider system 110, user devices 140, third-party systems 150, data sources 160, content management system 170, and/or various other example systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid-state device, magnetic disk, or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include any type of biometric sensor, a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. In various illustrative implementations, any type of networking configuration may be achieved using communications adapter 540, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 500 in response to the processor 510 executing an implementation of instructions contained in main memory 515. Such instructions can be read into main memory 515 from another computer-readable medium, such as the storage device 525. Execution of the implementation of instructions contained in main memory 515 causes the computing system 500 to perform the illustrative processes described herein. One or more processors in a multi-processing implementation may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 5, implementations of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 5 as singular, stand-alone devices, one of ordinary skill in the art will appreciate that, in some implementations, the computing system 500 may include virtualized systems and/or system resources. For example, in some implementations, the computing system 500 may be a virtual switch, virtual router, virtual host, or virtual server. In various implementations, computing system 500 may share physical storage, hardware, and other resources with other virtual machines. In some implementations, virtual resources of the network 130 (e.g., network 130 of FIG. 1) may include cloud computing resources such that a virtual resource may rely on distributed processing across more than one physical processor, distributed memory, etc.

FIGS. 6A-6T are example illustrations depicting a graphical user interface (GUI) 600, according to some implementations. The GUI 600 enables a user (also referred to herein as a "third-party") to generate capacity plans, modify and update control structures (based on rules), modify and update configuration parameters, review and query sub-ledgers associated with containers, and review and query particular exchanges on the ledger. In various arrangements, the user may have a user account with login credentials associated therewith for the GUI 600 and user data stored in a database (e.g., capacity plan database 118 and/or third-party database 119). The GUI 600 can be generated by interface generator 182 of FIG. 1.

FIG. 6A illustrates a user device that has navigated to an online webpage (e.g., via a URL) or user application (e.g., mobile application) that presents GUI 600. As shown, the GUI 600 can include a plurality of interactive elements including selectable areas 602, 604, 608, 610, toggles 612A-612D, and a selectable button 614, 616, and 618. As shown, the capacity plan can include a plurality of containers the user can customize. Interactive elements (e.g., input fields, scroll elements, selectable icons, toggles, etc.) can include, but are not limited to, text input, buttons, drop-downs, speech-to-text, and so on. Furthermore, various interactive elements are contemplated in this disclosure. For example, a user may select (e.g., via a touchscreen or pointer) a selectable area 602 to maximize on the viewport. In another example, the user may select toggle 612A to enable or disable the container. In yet another example, the user may edit a container by selecting selectable button 616, delete a container by selecting selectable button 618, or add a container by selecting selectable button 614.

Figure 6B:
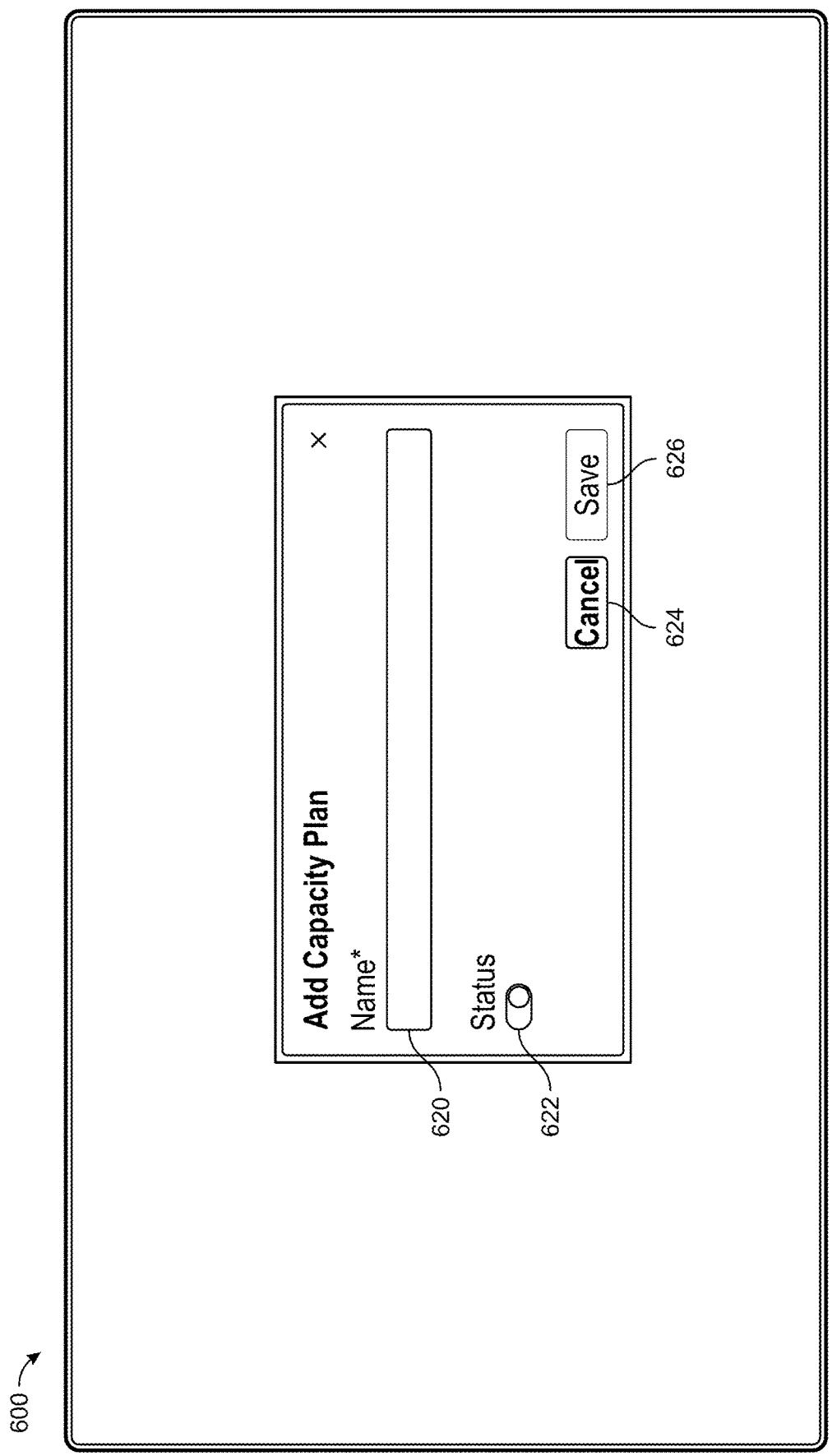
FIGS. 6A-6T are example illustrations depicting a graphical user interface, according to some implementations.
Figure 6D:
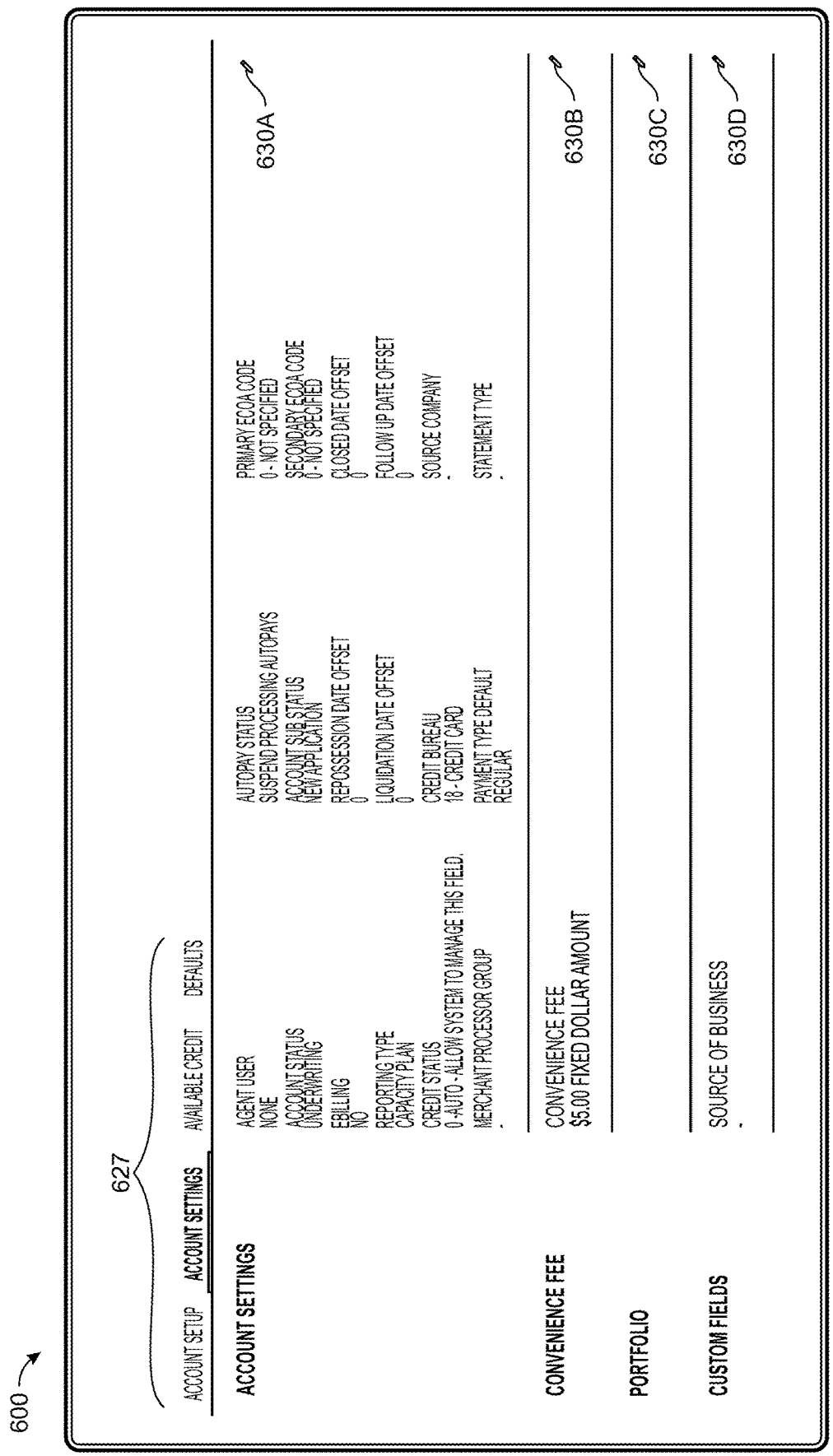
Figure 6E:
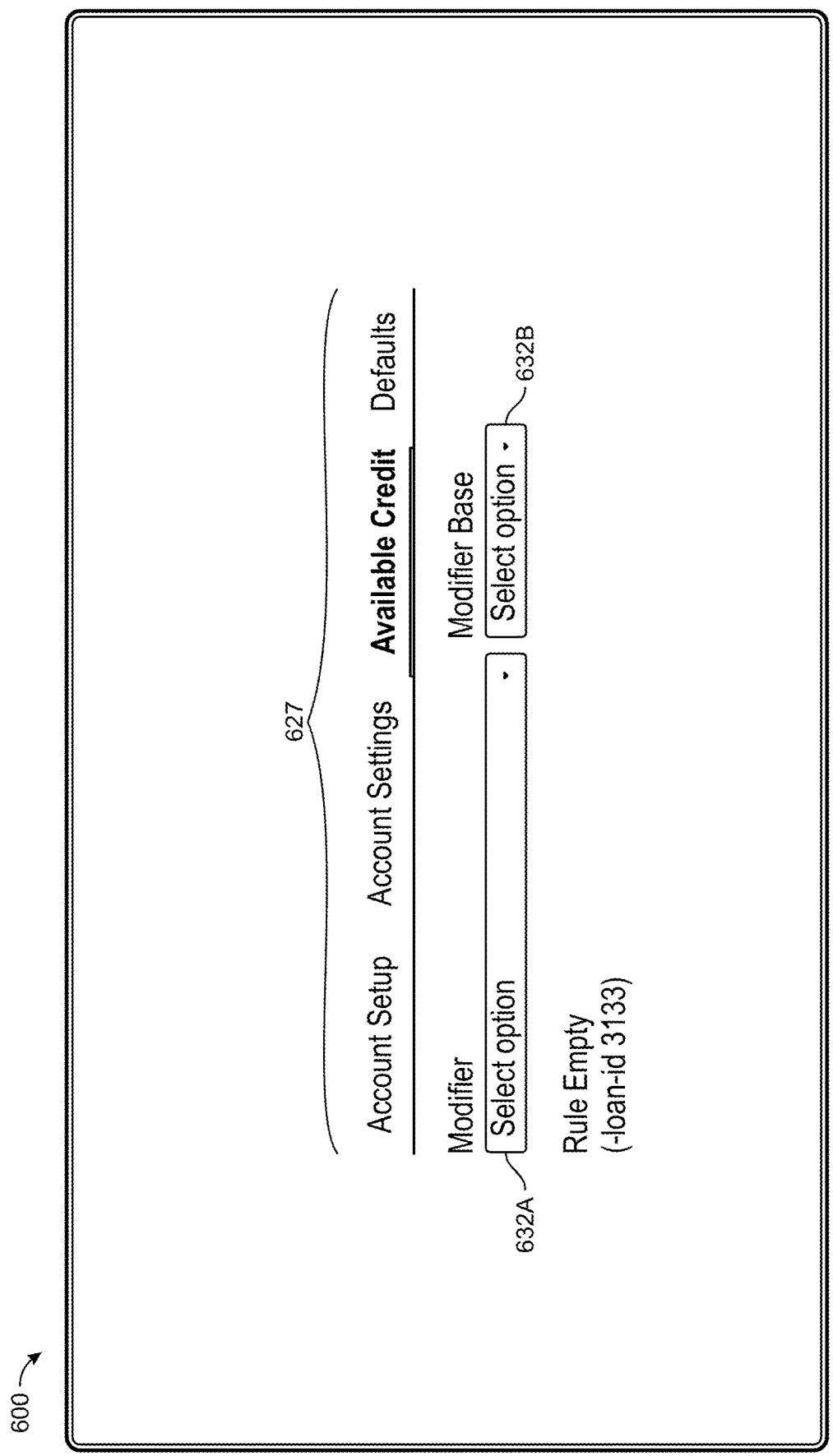

In example illustration FIG. 6B, upon a user selecting selectable button 614, the user device 140 may be presented with the GUI 600 including a plurality of interactive elements such as, but not limited to, text input 620, toggle 622, and selectable buttons 624 and 626. For example, the user may desire to create a new capacity plan upon selecting selectable button 614, and in the GUI 600 the user can name the capacity plan and determine a status, and in turn save or cancel the new capacity plan.

Figure 6F:
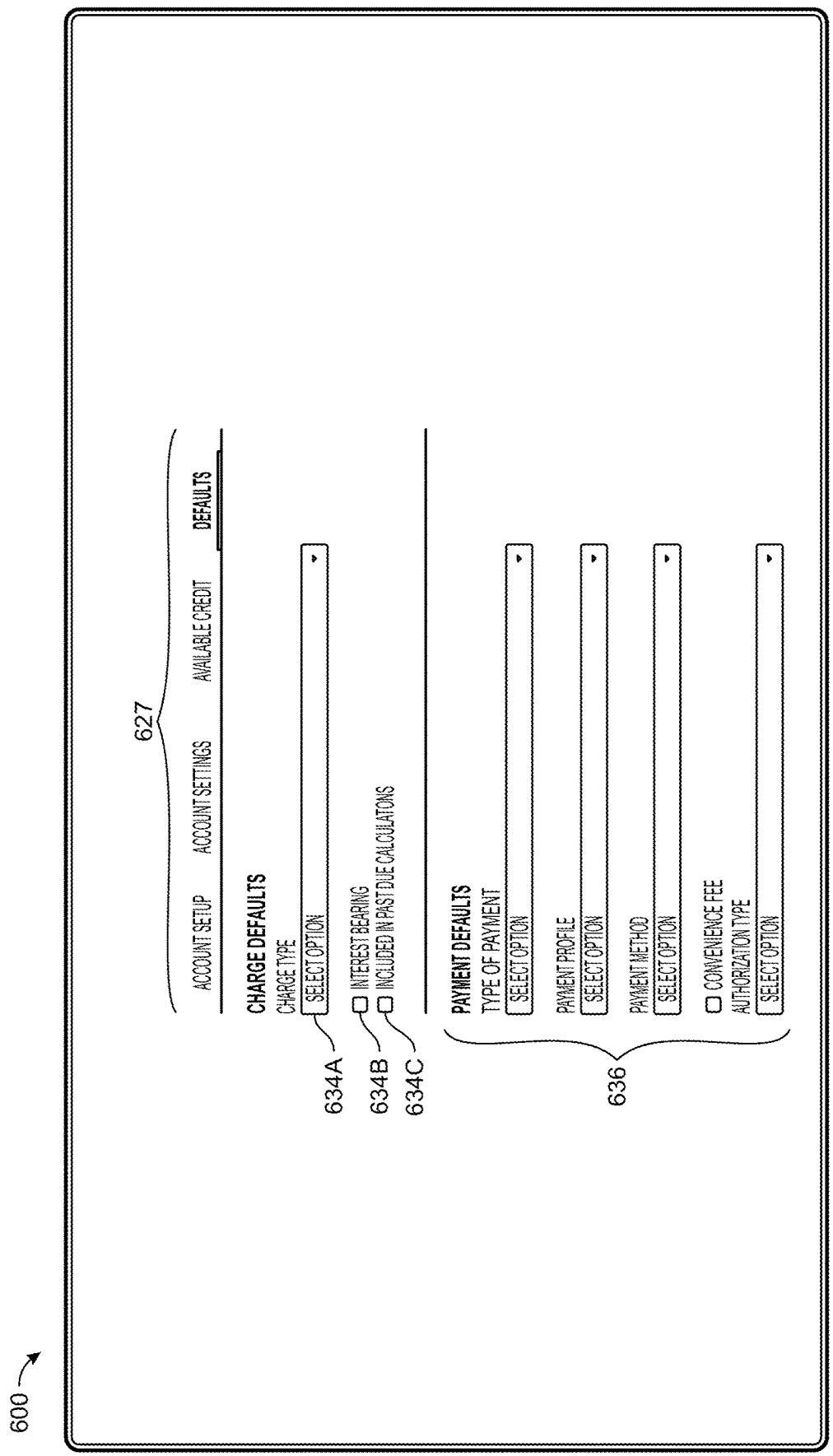
Figure 6G:
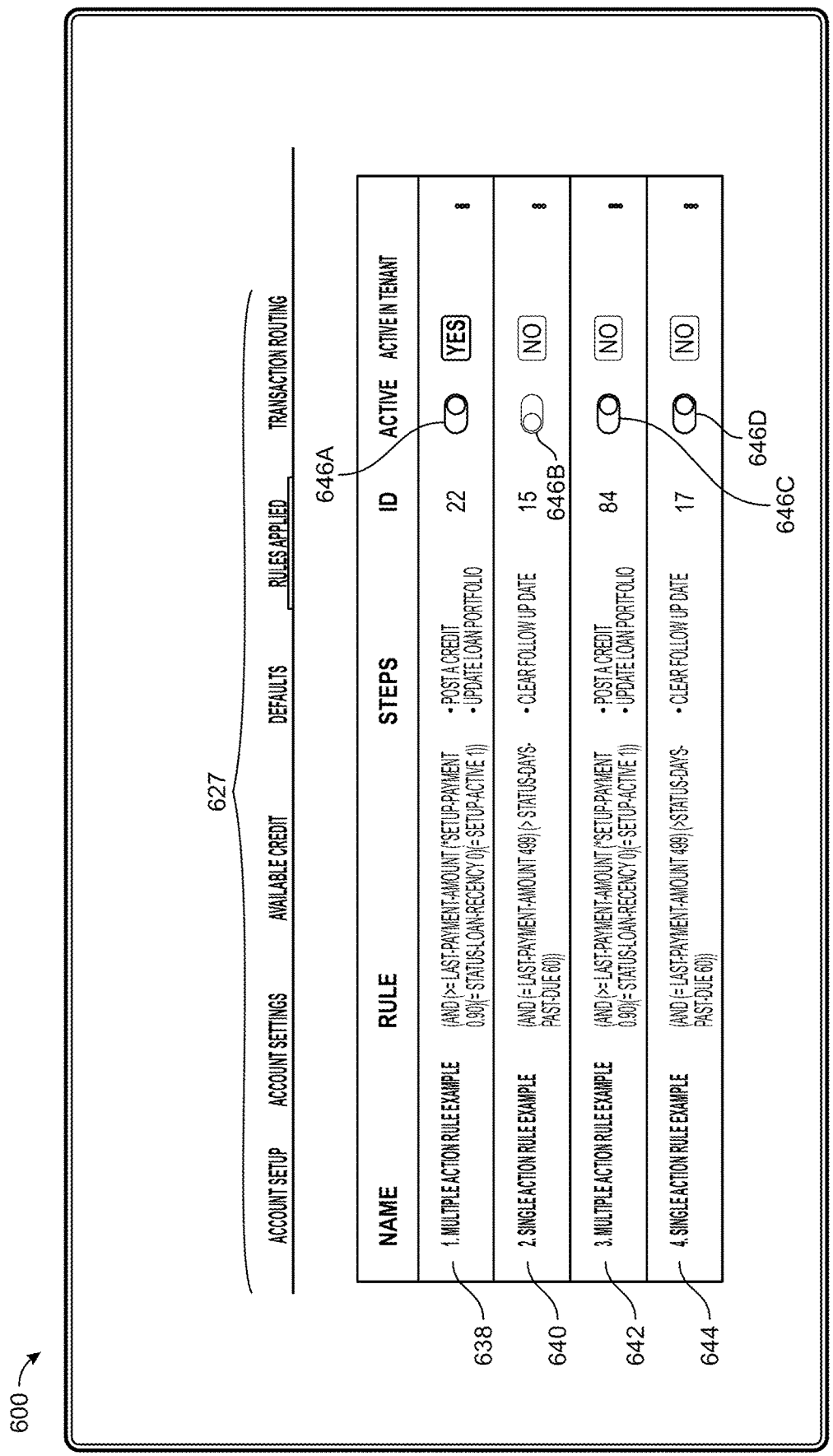
Figure 6H:
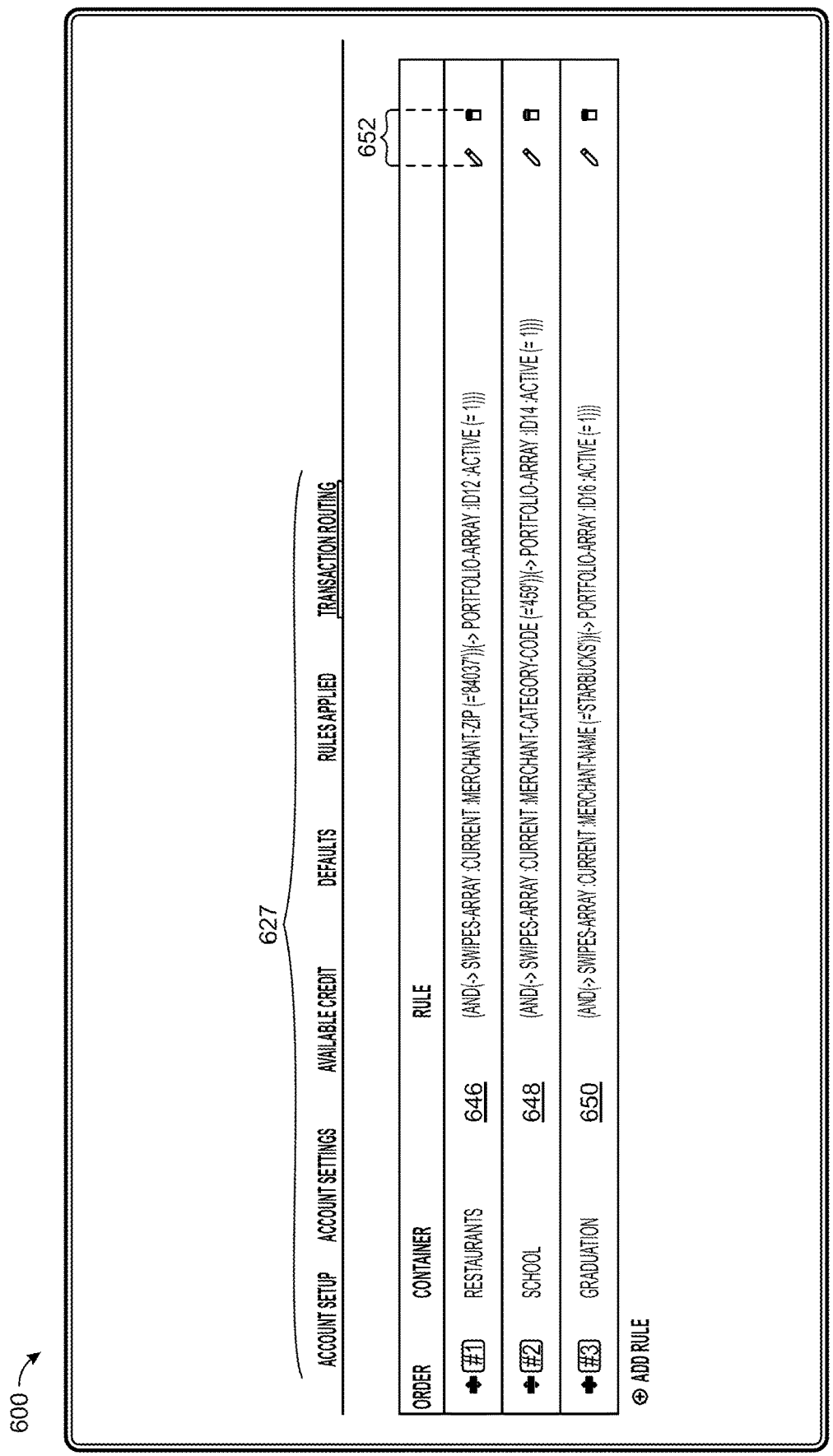
Figure 6I:
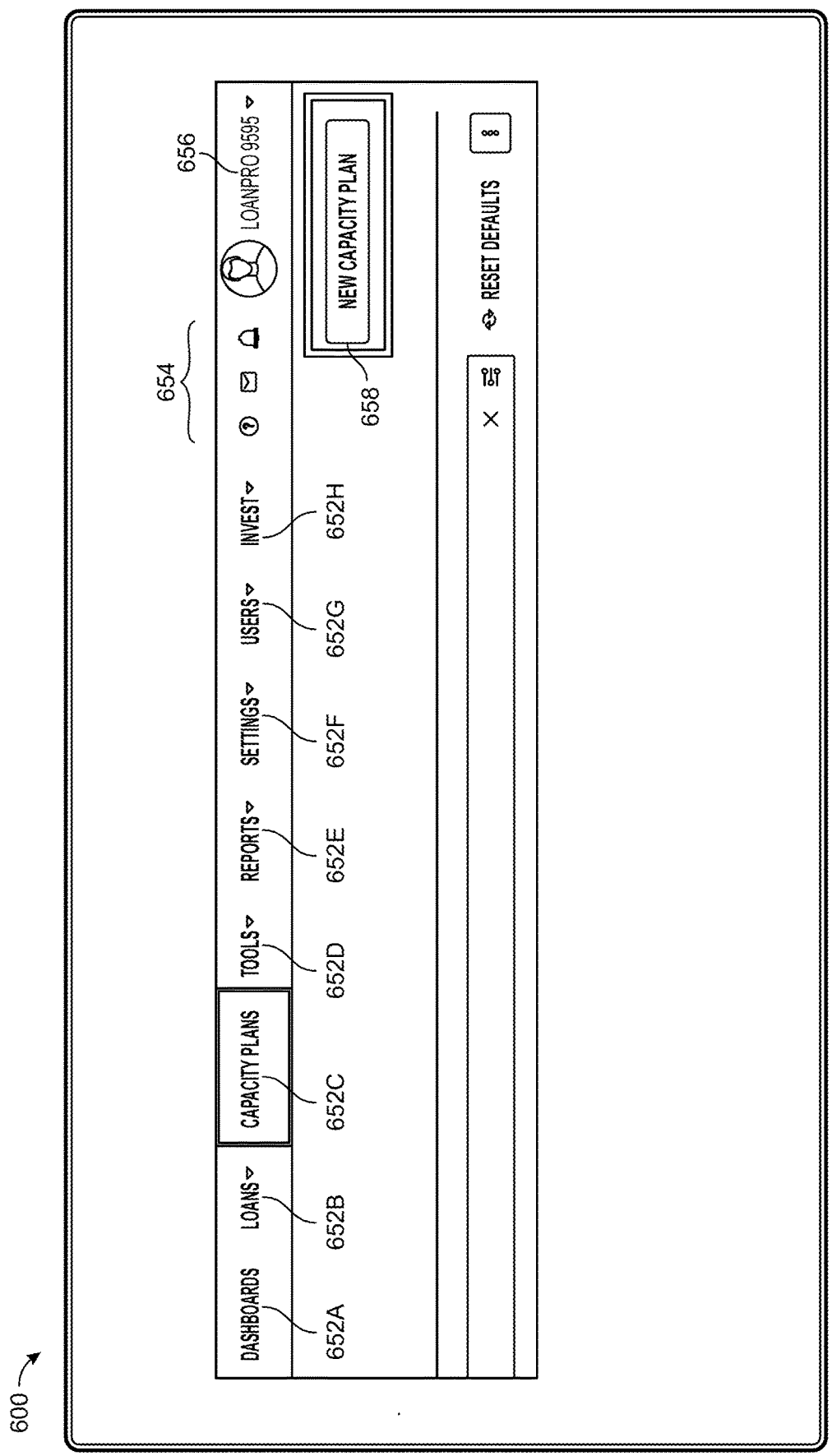

In example illustrations FIGS. 6C-6H, upon a user selecting selectable button 626, the user device 140 may be presented with the GUI 600 including a plurality of interactive elements such as, but not limited to, selectable areas 627, 638, 640, 642, 644, 647, 646, 650, selectable buttons 628A-628B, 630A-630D, 632A-632B, 634A-634C, 636, 652, and toggles 646A-646D. For example, upon a user selecting selectable button 626 the user can setup their new capacity plan. Upon selecting the one or more interactive elements, the user can customize the capacity plan including custom fields and account settings (FIG. 6D), available credit (FIG. 6E), and charge and payment defaults (FIG. 6F). In another example, the user device 140 can interact with the GUI 600 by designating one or more rules (FIG. 6G) to identify a condition on a loan and a corresponding action to be performed based on the condition. In the following example, the user can activate or deactivate the rules based on toggling toggle 646A-646D. In yet another example, the user device 140 can interact with the GUI 600 by designating how exchanges will be applied using control structures (FIG. 6H). In the following example, the user can also edit the control structures of a particular container based on selecting selectable buttons 652.

Figure 6L:
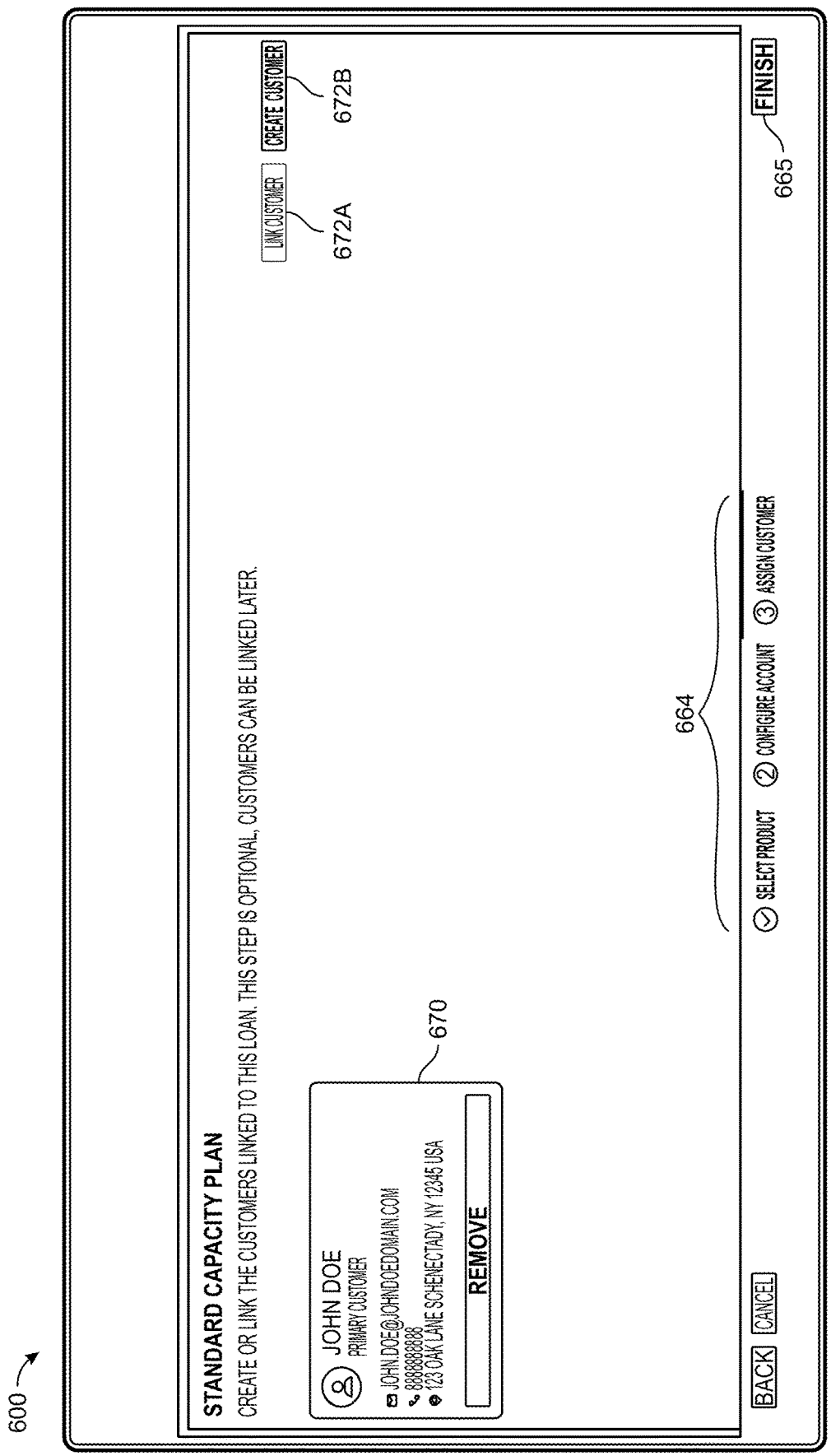
Figure 6N:
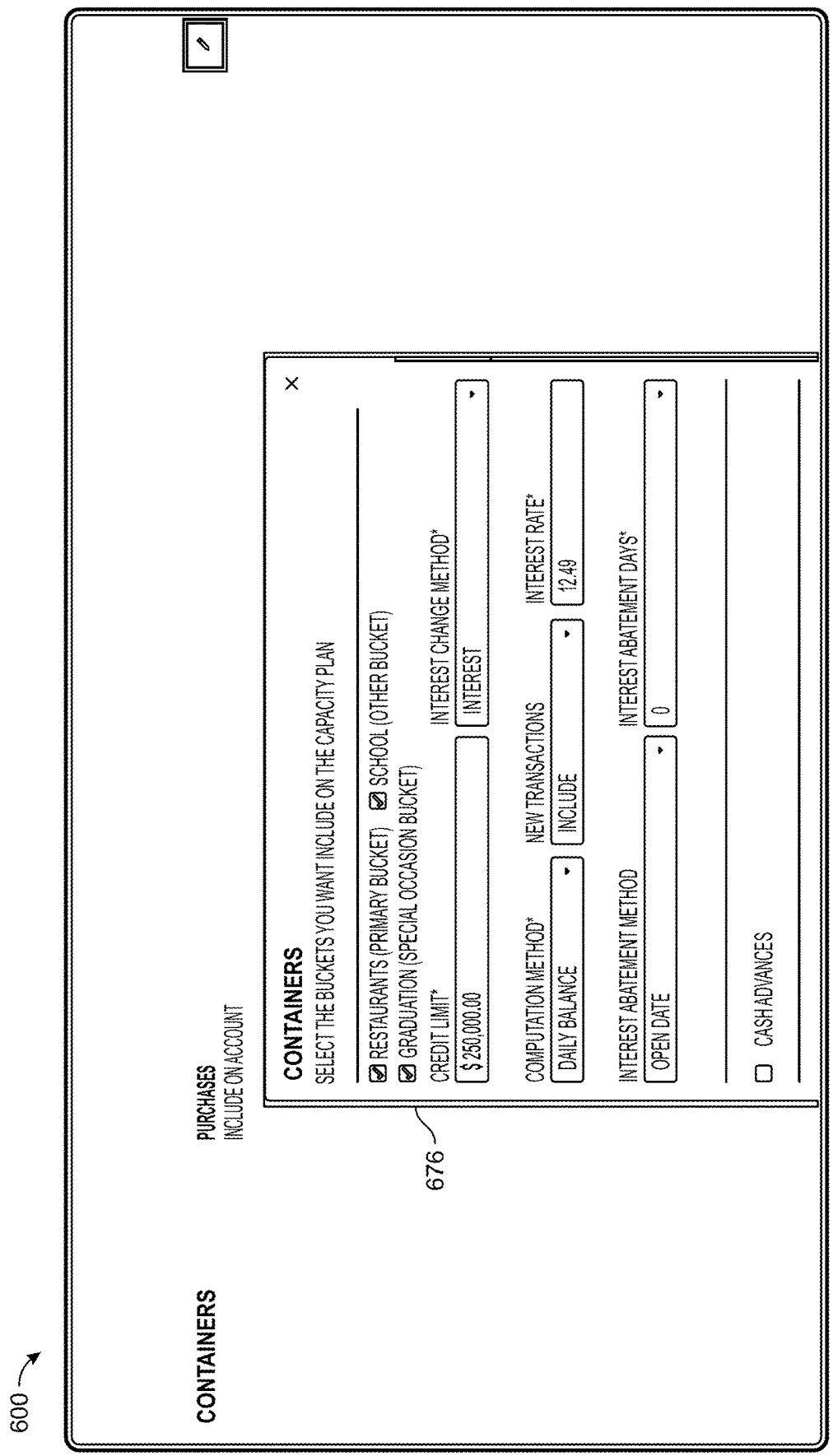
Figure 6P:
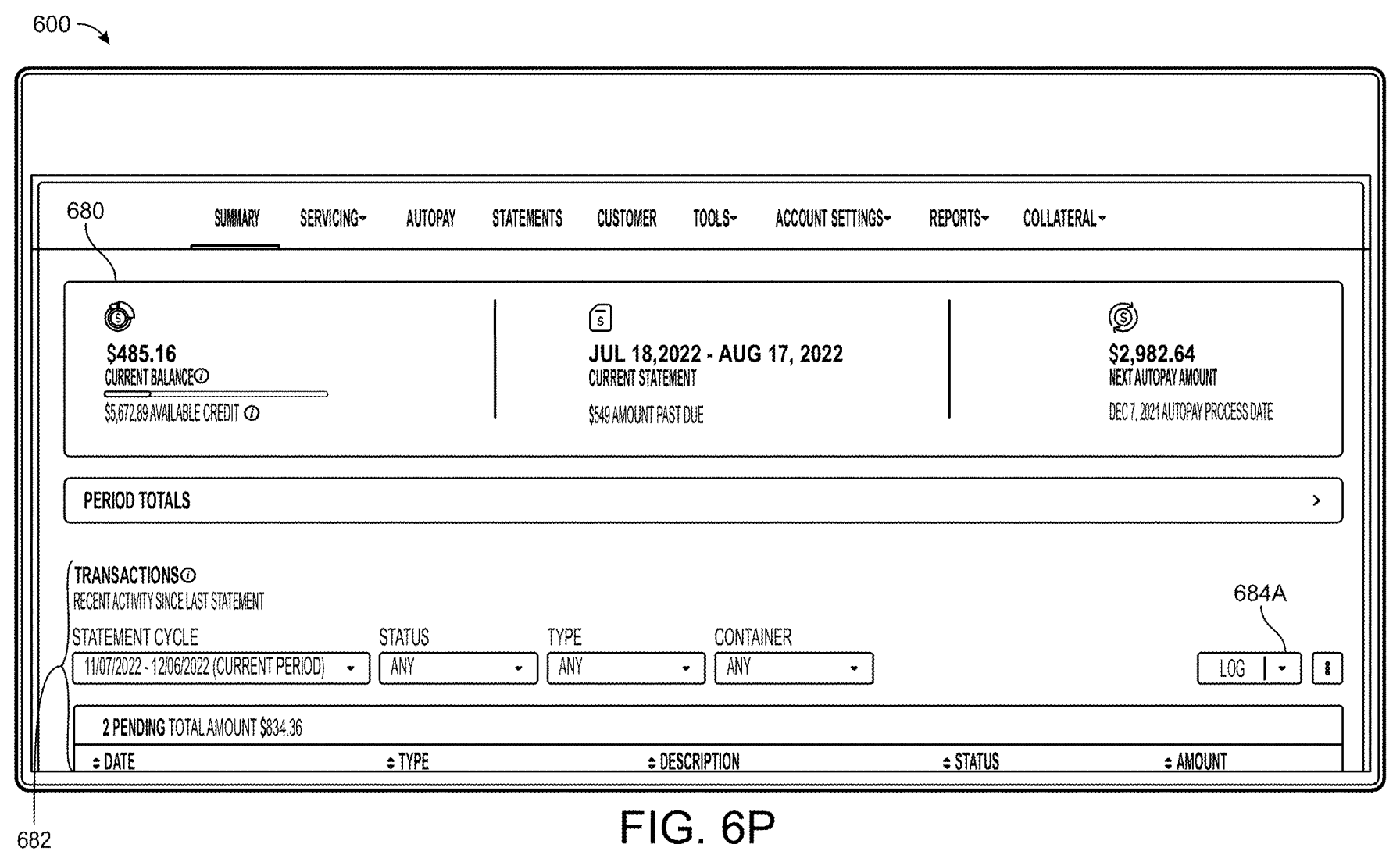
Figure 6Q:
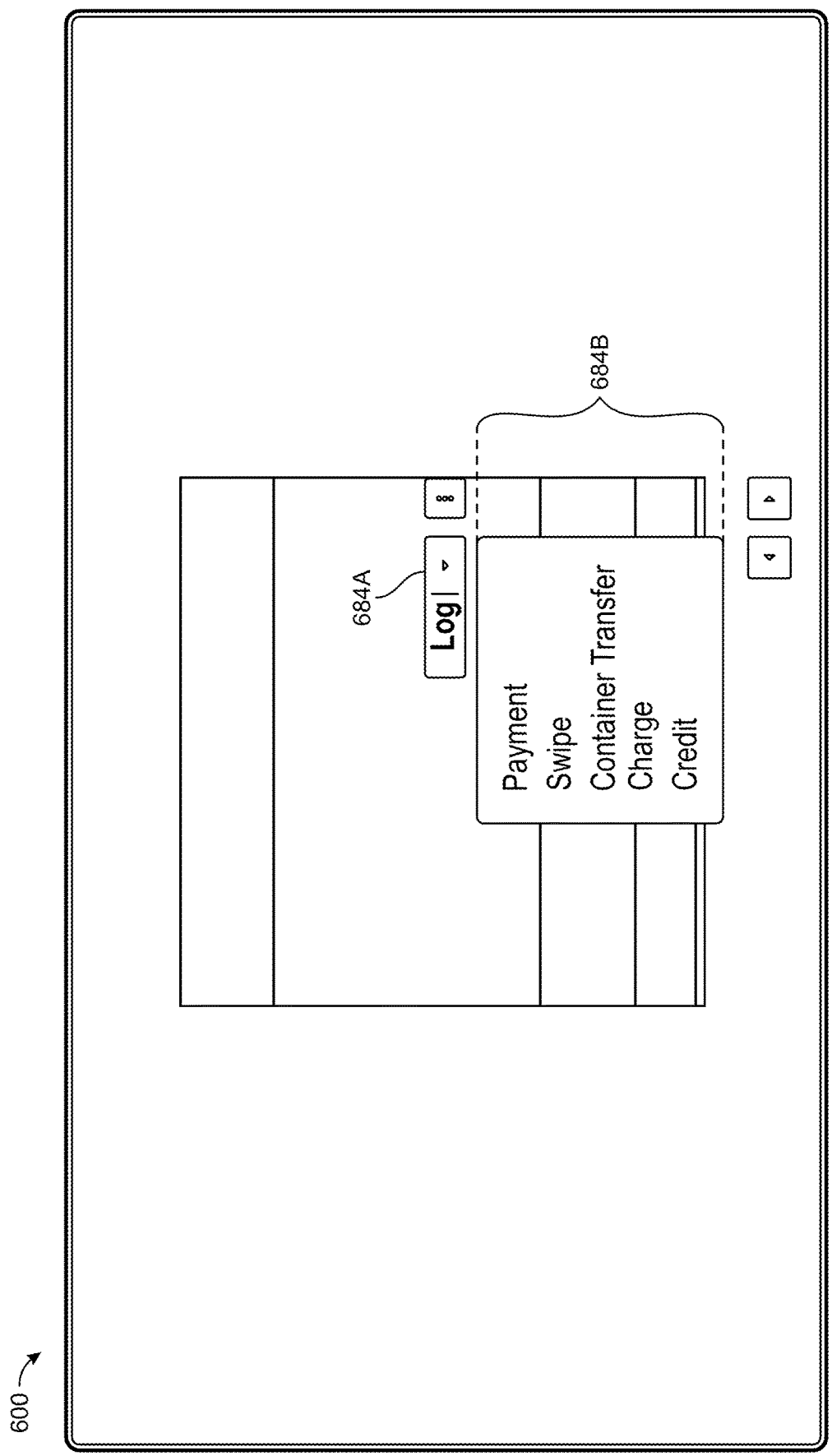
Figure 6S:
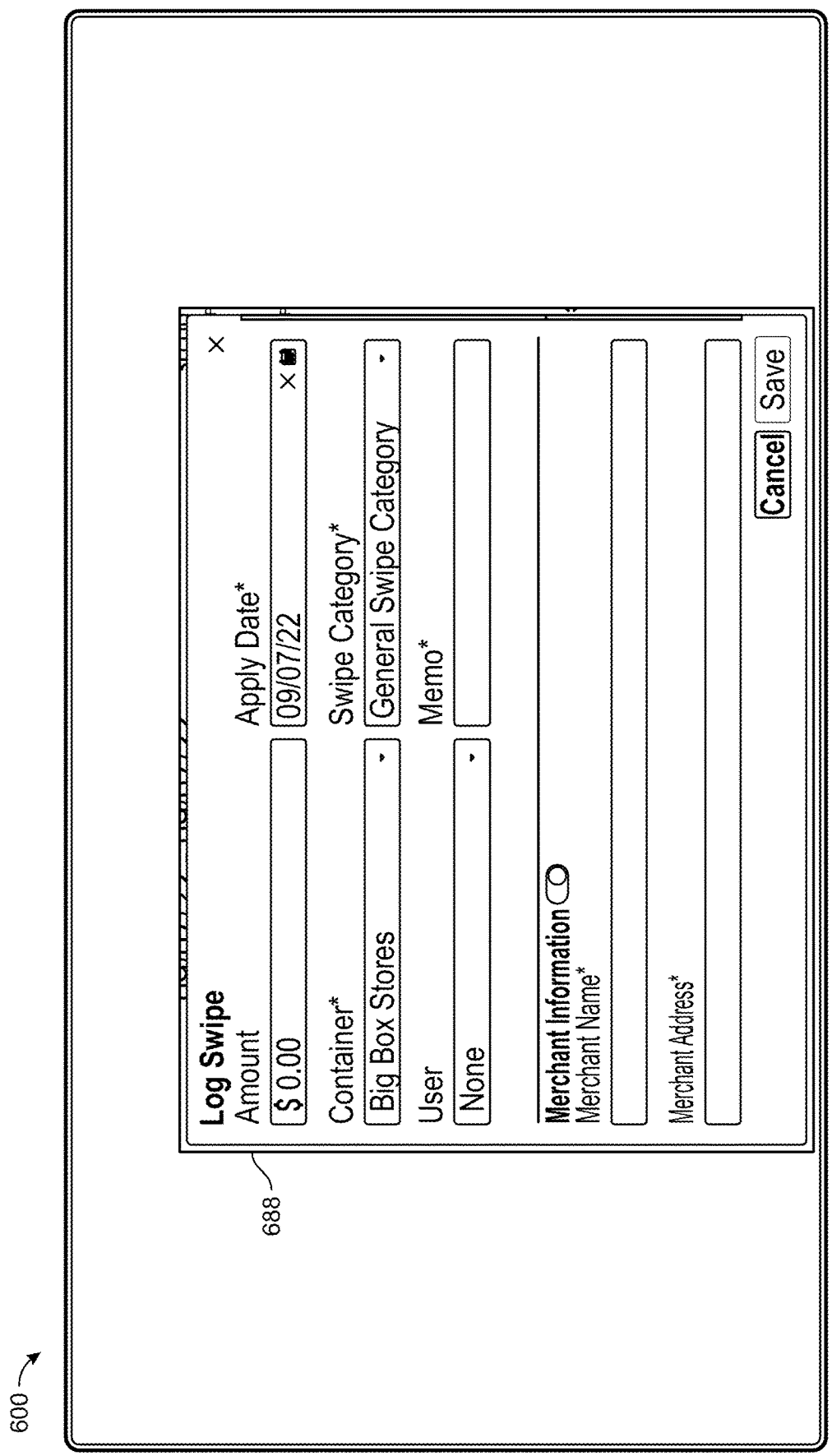

In example illustration FIGS. 6I-6O, the user device 140 may be presented with the GUI 600 including a plurality of interactive elements such as, but not limited to, selectable buttons 652A-652H, 654, 656, 658, 664, 665, 668, 672A-672B, 674B-674C, 678A-678C, look-up field 660, selectable areas 662A-662D, 664, 670, 676, text/drop-down fields 666, and toggle 676A. In general, FIGS. 6I-6O discloses functionality for creating new capacity plans via the GUI 600. For example, in response to selecting selectable button 658, FIGS. 6J-6L depict a process for setting up a new capacity plan including setting a product name (FIG. 6J), configuring account information including providing account information input (FIG. 6K), and linking or associating a customer account with the new capacity plan (FIG. 6L). At FIG. 6M, the user device 140 can be utilized by a user to enable setting and creating configuration parameters (e.g., credit limit, interest rate, etc.). At FIG. 6N, the user device 140 can be utilized by a user to configure individual containers based on setting, adding, or removing configuration parameters. At FIG. 6O, the user device 140 can be utilized by a user to configure individual capacity plan settings (e.g., loan status, portfolios, autopay status), add custom fields (e.g., 678B).

In example illustration FIGS. 6P-6T, the user device 140 may be presented with the GUI 600 including a plurality of interactive elements such as, but not limited to, selectable buttons 684A-684B, and selectable areas 680, 682, 686, 688, 690. In general, FIGS. 6P-6T discloses functionality for monitoring capacity plans and particular information regarding containers of the capacity plan via the GUI 600. For example. FIGS. 6Q-6T depict a process for logging various exchanges (FIG. 6Q), creating or logging a new payment (FIG. 6R), creating or logging a swipe (e.g., credit card or debit card swipe) (FIG. 6S), performing a container transfer (e.g., move money from one container to another container) (FIG. 6T). In various implementations, the fields to the selectable areas can be automatically populated by the interface generator 182 based on information stored in memory 176 and/or memory 116.

Figure 7:
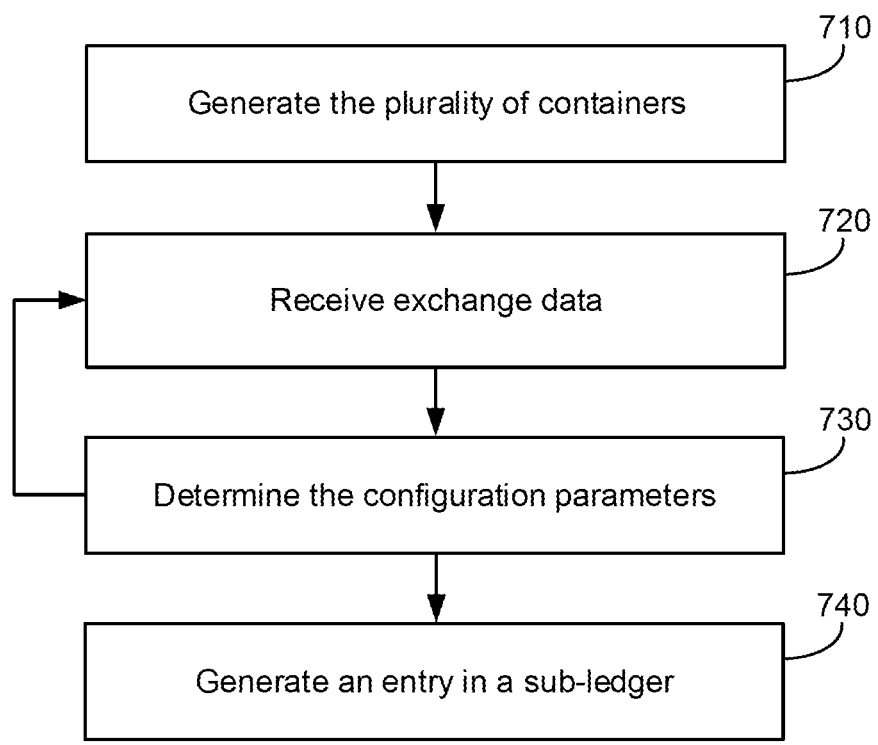
FIG. 7 is a flowchart of a method to model exchanges of a capacity plan with configuration parameters, according to some implementations.

FIG. 7 is a flowchart of a method 700 to model exchanges of a capacity plan with configuration parameters, according to some implementations. Provider system 110 can perform method 700. Further, any computing device described herein can be configured to perform method 700.

In broad overview of method 700, at block 710, the one or more processing circuits can generate the plurality of containers. At block 720, the one or more processing circuits can receive exchange data. At block 730, the one or more processing circuits can determine the configuration parameters. At block 740, the one or more processing circuits can generate an entry in the sub-ledger. Additional, fewer or different operations may be performed depending on the particular arrangement. In some embodiments, some or all operations of method 700 may be performed by one or more processors executing on one or more computing devices, systems or servers. In various embodiments, each operation may be re-ordered, added, removed or repeated. Blocks 710-740 are described in further detail with reference to FIGS. 2-3.

At block 710, the one or more processing circuits can generate the plurality of containers to include the configuration parameters of each container of the plurality of containers. In some implementations, the one or more processing circuits can generate the ledger according to the plurality of containers, wherein generating includes configuring the plurality of sub-ledgers associated with the plurality of containers based on the control structures. Additionally, the one or more processing circuits can receive, via the communication network interface, configuration input for the capacity plan, the configuration input indicating the configuration parameters of each container of the plurality of containers, and receive, via the communication network interface, the control structures.

At block 720, the one or more processing circuits can receive, via the communication network interface, exchange data for an exchange. In some implementations, the one or more processing circuits can request or collect additional exchange data from a data source identified based on the exchange data. That is, the user device 140 or third-party system 150 may provide the exchange data for the exchange but the one or more processing circuits may request additional data from data sources 160. For example, the third-party system 150 may provide credit card information for the exchange but the one or more processing circuits may also need credit network information (e.g., rewards information, other card holders, credit score, etc.), and as such may request information from a credit card network (e.g., data source 160). The additional exchange data can be enriched with the exchange data based on aggregating the additional exchange data into the exchange data. For example, enriching can include removing duplicate information and aggregating the additional exchange data and exchange data into a new data structure or into the existing exchange data.

At block 730, the one or more processing circuits can determine the configuration parameters with which the exchange is to be modeled based on the exchange data and the control structures of the plurality of sub-ledgers, wherein the control structures specify one or more controls for each container of the plurality of containers, the control structures for a given container of the plurality of containers to be used to determine allocation of exchanges to the given container for handling according to the configuration parameters of the given container. In some implementations, determining the configuration parameters with which the exchange is to be modeled is further based on at least one of cross-referencing the exchange data with a control structure, or applying the control structure to the exchange data. The control structures can include one or more instructions for modeling exchanges with the configuration parameters of a given sub-ledger of the plurality of sub-ledgers. In some implementations, determining the configuration parameters with which the exchange is to be modeled is further based on at least one of cross-referencing the exchange data with the control structure or applying the control structure to the exchange data.

For example, the configuration parameters may be stored in memory of the one or more processing circuits. In the following example, the memory can be accessed to obtain the control structure including a rules dataset which can be cross-referenced with the exchange data. In some implementations, when multiple control structures conflict on which container to receive the exchange, a routing priority can be accessed or determined to determine which control structure is prioritized in routing the exchange to a particular container. In some implementations, determining the configuration parameters with which the exchange is to be modeled is based on inputting the exchange data and the control structure and generating an output prediction of the sub-ledger of the plurality of sub-ledgers to generate the entry in and broadcast the exchange to. Modeling the exchange can include training a model (e.g., artificial intelligence (AI), machine learning, neural network, linear regression, estimator) by the one or more processing circuits using previous exchanges that were routed based on exchange data and configuration parameters. The model can then be configured to receive configuration parameters and/or the exchange data as input and outputting a prediction of the sub-ledger to broadcast the exchange to. In some implementations, block 720 can be repeated to fetch, collect, or receive additional exchange data for the exchange. In particular, the additional exchange data can be fetched, collected, or received from a third-party (e.g., third-party system 150) or data sources (e.g., data source 160) in response to determining additional exchange data can be utilized prior to generating an entry in block 640. The determination that additional exchange data can be utilized may be based on the control structure. For example, additional exchange data can include real-time bank account information such as balances at a third-party. In another example, additional exchange data can include market information from data sources such as current interest rates from the federal reserve.

At block 740, the one or more processing circuits can generate an entry in a sub-ledger corresponding to the determined configuration parameters to broadcast the exchange in the sub-ledger of the plurality of sub-ledgers according to the control structures of a corresponding container. A ledger can receive broadcasted exchanges associated with the capacity plan. In particular, a ledger can include a plurality of sub-ledgers each associated with a container of a plurality of containers such that each exchange of the ledger is broadcasted within a sub-ledger of the plurality of sub-ledgers. In some implementations, the one or more processing circuits can generate the ledger according to the plurality of containers, wherein generating includes configuring one or more sub-ledgers associated with the plurality of containers based on the control structures.

Some example implementations, according to the present disclosure, are now described.

Some implementations relate to a system to provide a plurality of configuration parameters for individual exchanges included in a capacity plan. The system includes a communication network interface to interface with a communication network and a memory to store a plurality of containers corresponding to the capacity plan, each container of the plurality of containers including configuration parameters specifying one or more aspects of handling a draw exchange included in the capacity plan, and a ledger to broadcast exchanges associated with the capacity plan, the ledger including a plurality of sub-ledgers each associated with a container of the plurality of containers, wherein each exchange of the ledger is broadcasted within at least one sub-ledger of the plurality of sub-ledgers. The system further includes one or more processors to receive, via the communication network interface, configuration input for the capacity plan, the configuration input indicating the configuration parameters of each container of the plurality of containers, receive, via the communication network interface, control structures specifying one or more controls for each container of the plurality of containers, the control structures for a given container of the plurality of containers to be used to determine allocation of exchanges to the given container for handling according to the configuration parameters of the given container, generate the plurality of containers to include the configuration parameters of each container of the plurality of containers, and receive exchange data for an exchange and broadcast the exchange in a sub-ledger of the plurality of sub-ledgers according to a control structure of the control structures of a corresponding container.

In some implementations, the one or more processors are further to generate a statement of the capacity plan according to all exchanges broadcasted in the ledger and according to the plurality of configuration parameters, and present, via a viewport of a user device, a graphical user interface (GUI) including the statement.

In some implementations, the memory is further to store an exchange modeler to model the ledger by inputting the configuration parameters and the ledger including the plurality of sub-ledgers and generating an output prediction to the ledger, wherein the output prediction is a currency estimate or currency calculation associated with at least one container.

In some implementations, the one or more processors are further to generate the ledger according to the plurality of containers, wherein generating includes configuring the plurality of sub-ledgers associated with the plurality of containers based on the control structures.

In some implementations, the one or more processors are further to generate the control structures specifying the one or more controls for each container of the plurality of containers, wherein each control structure of the control structures includes and executes one or more instructions determining the sub-ledger of the plurality of sub-ledgers to receive the broadcasted exchange.

In some implementations, a first container of the plurality of containers corresponds to a first control structure of the control structures, and wherein a second container of the plurality of containers corresponds to a second control structure of the control structures, wherein the one or more instructions of each control structure restrict or allow the broadcasting of the exchange to one of the plurality of containers based on a rules dataset.

In some implementations, the exchange data includes at least one of exchange-specific data including one or more of a merchant identifier, a date, a time, a geolocation, a merchant, a hash, or a cryptogram, capacity-plan-specific exchange data including one or more of a line of capacity limit, a plan product, a portfolio, a status, a balance, or a delinquency measure, and customer-specific exchange data including one or more of a date of birth, a customer identifier (e.g., a customer name), a customer address, a geolocation, a zip code, a wallet identifier, or a public key.

In some implementations, receiving the exchange data further includes establishing, via the communication network interface utilizing a first application programming interface (API), a data feed associated with the exchange request, wherein the data feed is at least one of a credit card network, an exchange acquiring institution, or a merchant.

In some implementations, the one or more processors are further to in response to broadcasting the exchange in the sub-ledger of the plurality of sub-ledgers, update a second sub-ledger based on the exchange data and according to a second control structure of the control structures of a second corresponding container.

In some implementations, the one or more processors are further to determine global configuration parameters of the plurality of containers, wherein the global configuration parameters include an aggregate of the configuration parameters of each of the plurality of containers, and generate, in real-time, one or more global estimates based on executing one or more functions calls with the control structures of each of the plurality of containers, wherein the one or more global estimates include at least one of a minimum threshold amount, a frequency, a response cycle, an end date cycle, a compliance rating.

Some implementations related to provide a plurality of configuration parameters for individual exchanges included in a capacity plan, the computer-implemented method including receiving, by one or more processors, configuration input for a capacity plan of a plurality of capacity plans, a plurality of containers corresponding to the capacity plan, each container of the plurality of containers including configuration parameters specifying one or more aspects of handling a draw exchange included in the capacity plan, the configuration input indicating the configuration parameters of each container of the plurality of containers, receiving, by the one or more processors, control structures specifying one or more controls for each container of the plurality of containers, the control structures for a given container of the plurality of containers to be used to determine allocation of exchanges to the given container for handling according to the configuration parameters of the given container, generating, by the one or more processors, the plurality of containers to include the configuration parameters of each container of the plurality of containers, and receiving, by the one or more processors, exchange data for an exchange and broadcast the exchange in a sub-ledger of a plurality of sub-ledgers according to a control structure of the control structures of a corresponding container, wherein a ledger includes the plurality of sub-ledgers each associated with a container of the plurality of containers of the capacity plan, wherein each exchange of the ledger is broadcasted within at least one sub-ledger of the plurality of sub-ledgers.

In some implementations, the computer-implemented further including generating, by the one or more processors, a statement of the capacity plan according to all exchanges broadcasted in the ledger and according to the plurality of configuration parameters, and presenting, by the one or more processors via a viewport of a user device, a graphical user interface (GUI) including the statement.

In some implementations, the computer-implemented method further including modelling, by the one or more processors, the ledger by inputting the configuration parameters and the ledger including the plurality of sub-ledgers and generating an output prediction to the ledger, wherein the output prediction is a currency estimate or currency calculation associated with at least one container.

In some implementations, the computer-implemented method further including generating, by the one or more processors, the ledger according to the plurality of containers, wherein generating includes configuring the plurality of sub-ledgers associated with the plurality of containers based on the control structures.

In some implementations, the computer-implemented method further including generating, by the one or more processors, the control structures specifying the one or more controls for each container of the plurality of containers, wherein each control structure of the control structures includes and executes one or more instructions determining the sub-ledger of the plurality of sub-ledgers to receive the broadcasted exchange.

In some implementations, a first container of the plurality of containers corresponds to a first control structure of the control structures, and wherein a second container of the plurality of containers corresponds to a second control structure of the control structures, wherein the one or more instructions of each control structure restrict or allow the broadcasting of the exchange to one of the plurality of containers based on a rules dataset.

In some implementations, the exchange data includes at least one of exchange-specific data including one or more of a merchant identifier, a date, a time, a geolocation, a merchant, a hash, or a cryptogram, capacity-plan-specific exchange data including one or more of a line of capacity limit, a plan product, a portfolio, a status, a balance, or a delinquency measure, and customer-specific exchange data including one or more of a date of birth, a customer identifier (e.g., a customer name), a customer address, a geolocation, a zip code, a wallet identifier, or a public key.

In some implementations, receiving the exchange data further includes establishing, by the one or more processors utilizing a first application programming interface (API), a data feed associated with the exchange request, wherein the data feed is at least one of a credit card network, an exchange acquiring institution, or a merchant.

In some implementations, the computer-implemented further including in response to broadcasting the exchange in the sub-ledger of the plurality of sub-ledgers, updating, by the one or more processors, a second sub-ledger based on the exchange data and according to a second control structure of the control structures of a second corresponding container, determining, by the one or more processors, global configuration parameters of the plurality of containers, wherein the global configuration parameters include an aggregate of the configuration parameters of each of the plurality of containers, and generating, by the one or more processors in real-time, one or more global estimates based on executing one or more functions calls with the control structures of each of the plurality of containers, wherein the one or more global estimates include at least one of a minimum threshold amount, a frequency, a response cycle, an end date cycle, a compliance rating.

Some implementations relate to one or more non-transitory computer-readable storage media having instructions stored thereon that, when executed by at least one processing circuit, cause the at least one processing circuit to receive configuration input for a capacity plan of a plurality of capacity plans, a plurality of containers corresponding to the capacity plan, each container of the plurality of containers including configuration parameters specifying one or more aspects of handling a draw exchange included in the capacity plan, the configuration input indicating the configuration parameters of each container of the plurality of containers, receive control structures specifying one or more controls for each container of the plurality of containers, the control structures for a given container of the plurality of containers to be used to determine allocation of exchanges to the given container for handling according to the configuration parameters of the given container, generate the plurality of containers to include the configuration parameters of each container of the plurality of containers, and receive exchange data for an exchange and broadcast the exchange in a sub-ledger of a plurality of sub-ledgers according to a control structure of the control structures of a corresponding container, wherein a ledger includes the plurality of sub-ledgers each associated with a container of the plurality of containers of the capacity plan, wherein each exchange of the ledger is broadcasted within at least one sub-ledger of the plurality of sub-ledgers.

Some implementations relate to a system to model exchanges of a capacity plan with configuration parameters, including a communication network interface to interface with a communication network and a memory to store a ledger to broadcast exchanges associated with the capacity plan, the ledger including a plurality of sub-ledgers each associated with a container of a plurality of containers, wherein each exchange of the ledger is broadcasted within a sub-ledger of the plurality of sub-ledgers, and control structures to model exchanges with the configuration parameters of a given sub-ledger of the plurality of sub-ledgers. The system further includes one or more processors to receive, via the communication network interface, exchange data for an exchange, determine the configuration parameters with which the exchange is to be modeled based on the exchange data and the control structures of the plurality of sub-ledgers, and generate an entry in the sub-ledger corresponding to the determined configuration parameters to broadcast the exchange in the sub-ledger of the plurality of sub-ledgers according to the control structures of a corresponding container.

In some implementations, the one or more processors are further to request or collect additional exchange data from a data source identified based on the exchange data and enrich the exchange data based on aggregating the additional exchange data into the exchange data.

In some implementations, determining the configuration parameters with which the exchange is to be modeled is further based on at least one of cross-referencing the exchange data with the control structure, or applying the control structure to the exchange data.

In some implementations, determining the configuration parameters with which the exchange is to be modeled is based on inputting the exchange data and the control structure and generating an output prediction of the sub-ledger of the plurality of sub-ledgers to generate the entry in and broadcast the exchange to.

In some implementations, the one or more processors are further to generate the ledger according to the plurality of containers, wherein generating includes configuring one or more sub-ledgers associated with the plurality of containers based on the control structures.

In some implementations, the one or more processors are further to generate the control structures specifying one or more controls for each container of the plurality of containers, wherein each control structure of the control structures includes and executes one or more instructions determining the sub-ledger of the plurality of sub-ledgers to receive the broadcasted exchange.

In some implementations, a first container of the plurality of containers corresponds to a first control structure of the control structures, and wherein a second container of the plurality of containers corresponds to a second control structure of the control structures, wherein the one or more instructions of each control structure restrict or allow the broadcasting of the exchange to one of the plurality of containers based on a rules dataset.

In some implementations, the exchange data includes at least one of exchange-specific data including one or more of a merchant identifier, a date, a time, a geolocation of the exchange, a merchant, a hash, or a cryptogram, capacity-plan-specific exchange data including one or more of a line of capacity limit, a plan product, a portfolio, a status, a balance, or a delinquency measure, and customer-specific exchange data including one or more of a date of birth, a customer identifier (e.g., a customer name), a customer address, a geolocation of a customer, a zip code, a wallet identifier, or a public key.

In some implementations, receiving the exchange data further includes establishing, via the communication network interface utilizing a first application programming interface (API), a data feed associated with the exchange data, wherein the data feed is at least one of a credit card network, an exchange acquiring institution network, or a merchant network.

In some implementations, the one or more processors are further to in response to broadcasting the exchange in the sub-ledger of the plurality of sub-ledgers, update a second sub-ledger based on the exchange data and according to a second control structure of the control structures of a second corresponding container.

In some implementations, the one or more processors are further to determine global configuration parameters of the plurality of containers, wherein the global configuration parameters include an aggregate of the configuration parameters of each of the plurality of containers, and generate, in real-time, one or more global estimates based on executing one or more functions calls with the control structure of each of the plurality of containers, wherein the one or more global estimates include at least one of a minimum threshold amount, a frequency, a response cycle, an end date cycle, a compliance rating.

Some implementations related to A system to model exchanges of a capacity plan with configuration parameters, including a communication network interface to interface with a communication network, a ledger to broadcast exchanges associated with the capacity plan, the ledger including a plurality of sub-ledgers each associated with a container of a plurality of containers, wherein each exchange of the ledger is broadcasted within a sub-ledger of the plurality of sub-ledgers according to control structures of a corresponding container, the control structures to receive input specifying the control structures for each sub-ledger of the plurality of sub-ledgers, the control structures further model exchanges with the configuration parameters of a given sub-ledger of the plurality of sub-ledgers, a capacity modeler to receive the control structures and exchange data for an exchange, and determine the sub-ledger to broadcast the exchange corresponding to a control structure of the one or more control structures, and an exchange modeler to receive, via the communication network interface, exchange data for the exchange, continuously provide to the capacity modeler the exchange data and the control structures, and provide an indication of a determined sub-ledger to the ledger to broadcast the exchange in the determined sub-ledger of the plurality of sub-ledgers.

In some implementations, the ledger is further to generate, utilizing the control structure, an entry in the sub-ledger to broadcast the exchange.

In some implementations, the exchange modeler is further to request or collect additional exchange data from a data source identified based on the exchange data and enrich the exchange data based on aggregating the additional exchange data into the exchange data.

In some implementations, a first container of the plurality of containers corresponds to a first control structure of the control structures, and wherein a second container of the plurality of containers corresponds to a second control structure of the control structures, wherein one or more executable instructions of each control structure restrict or allow the broadcasting of the exchange to one of the plurality of containers based on a rules dataset.

In some implementations, the exchange data includes at least one of exchange-specific data including one or more of a merchant identifier, a date, a time, a geolocation, a merchant, a hash, or a cryptogram, capacity-plan-specific exchange data including one or more of a line of capacity limit, a plan product, a portfolio, a status, a balance, or a delinquency measure, and customer-specific exchange data including one or more of a date of birth, a customer identifier (e.g., a customer name), a customer address, a geolocation, a zip code, a wallet identifier, or a public key.

In some implementations, receiving the exchange data by the exchange modeler further includes establishing, via the communication network interface utilizing a first application programming interface (API), a data feed associated with the exchange data, wherein the data feed is at least one of a credit card network, an exchange acquiring institution network, or a merchant network.

In some implementations, the ledger is further to in response to broadcasting the exchange in the sub-ledger of the plurality of sub-ledgers, update a second sub-ledger based on the exchange data and according to a second control structure of the control structures of a second corresponding container.

Some implementations relate to a computer-implemented method to model exchanges of a capacity plan with configuration parameters, the computer-implemented method including receiving, by one or more processors, exchange data for an exchange, determining, by the one or more processors, configuration parameters with which the exchange is to be modeled based on the exchange data and a control structures of the plurality of sub-ledgers, wherein the control structures model exchanges with the configuration parameters of a given sub-ledger of a plurality of sub-ledgers, and generating, by the one or more processors, an entry in a sub-ledger of the plurality of sub-ledgers of a ledger corresponding to the determined configuration parameters to broadcast the exchange in the sub-ledger of the plurality of sub-ledgers according to the control structures of a corresponding container, the ledger is associated with the capacity plan and including the plurality of sub-ledgers each associated with a container of a plurality of containers, wherein each exchange of the ledger is broadcasted within the sub-ledger of the plurality of sub-ledgers.

In some implementations, the computer-implemented method further including generating, by the one or more processors, the control structures specifying one or more controls for each container of the plurality of containers, wherein each control structure of the control structures includes and executes one or more instructions determining the sub-ledger of the plurality of sub-ledgers to receive the broadcasted exchange, and wherein determining the configuration parameters with which the exchange is to be modeled is based on inputting the exchange data and the control structure and generating an output prediction of the sub-ledger of the plurality of sub-ledgers to generate the entry in and broadcast the exchange to.

Some implementations relate to a system to model exchanges of a capacity plan with configuration parameters, including a communication network interface to interface with a communication network, a memory to store a plurality of containers corresponding to the capacity plan, each container of the plurality of containers including configuration parameters specifying one or more aspects of handling a draw exchange included in the capacity plan, a ledger to broadcast exchanges associated with the capacity plan, the ledger including a plurality of sub-ledgers each associated with a container of the plurality of containers, wherein each exchange of the ledger is broadcasted within at least one sub-ledger of the plurality of sub-ledgers, and control structures to model exchanges with the configuration parameters of a given sub-ledger of the plurality of sub-ledgers. The system further includes one or more processors to generate the plurality of containers to include the configuration parameters of each container of the plurality of containers, receive, via the communication network interface, exchange data for an exchange, determine the configuration parameters with which the exchange is to be modeled based on the exchange data and the control structures of the plurality of sub-ledgers, wherein the control structures specify one or more controls for each container of the plurality of containers, the control structures for a given container of the plurality of containers to be used to determine allocation of exchanges to the given container for handling according to the configuration parameters of the given container, and generate an entry in a sub-ledger corresponding to the determined configuration parameters to broadcast the exchange in the sub-ledger of the plurality of sub-ledgers according to the control structures of a corresponding container.

In some implementations, the one or more processors are further to generate the ledger according to the plurality of containers by configuring the plurality of sub-ledgers associated with the plurality of containers based on the control structures, receive, via the communication network interface, configuration input for the capacity plan, the configuration input indicating the configuration parameters of each container of the plurality of containers, and receive, via the communication network interface, the control structures.

In some implementations, determining the configuration parameters with which the exchange is to be modeled is further based on at least one of cross-referencing the exchange data with a control structure or applying the control structure to the exchange data.

In some implementations, determining the configuration parameters with which the exchange is to be modeled is based on inputting the exchange data and the control structures and generating an output prediction of the sub-ledger of the plurality of sub-ledgers to generate the entry in and broadcast the exchange to.

In some implementations, the one or more processors are further to generate the control structures specifying one or more controls for each container of the plurality of containers, wherein each control structure of the control structures includes and executes one or more instructions determining the sub-ledger of the plurality of sub-ledgers to receive the broadcasted exchange.

In some implementations, a first container of the plurality of containers corresponds to a first control structure of the control structures, and wherein a second container of the plurality of containers corresponds to a second control structure of the control structures, wherein the one or more instructions of each control structure restrict or allow the broadcasting of the exchange to one of the plurality of containers based on a rules dataset.

In some implementations, the exchange data includes at least one of exchange-specific data including one or more of a merchant identifier, a date, a time, a geolocation of the exchange, a merchant, a hash, or a cryptogram, capacity-plan-specific exchange data including one or more of a line of capacity limit, a plan product, a portfolio, a status, a balance, or a delinquency measure, and customer-specific exchange data including one or more of a date of birth, a customer identifier (e.g., a customer name), a customer address, a geolocation of a customer, a zip code, a wallet identifier, or a public key.

In some implementations, receiving the exchange data further includes establishing, via the communication network interface utilizing a first application programming interface (API), a data feed associated with the exchange data, wherein the data feed is at least one of a credit card network, an exchange acquiring institution network, or a merchant network.

In some implementations, the one or more processors are further to in response to broadcasting the exchange in the sub-ledger of the plurality of sub-ledgers, update a second sub-ledger based on the exchange data and according to a second control structure of the control structures of a second corresponding container.

In some implementations, the one or more processors are further to determine global configuration parameters of the plurality of containers, wherein the global configuration parameters include an aggregate of the configuration parameters of each of the plurality of containers, and generate, in real-time, one or more global estimates based on executing one or more functions calls with the control structures of each of the plurality of containers, wherein the one or more global estimates include at least one of a minimum threshold amount, a frequency, a response cycle, an end date cycle, a compliance rating.

Some implementations related to a method to model exchanges of a capacity plan with configuration parameters, the computer-implemented method including generating, by one or more processors, a plurality of containers to include the configuration parameters of each container of the plurality of containers, receiving, by the one or more processors via a communication network interface, exchange data for an exchange, determining, by the one or more processors, the configuration parameters with which the exchange is to be modeled based on the exchange data and control structures of a plurality of sub-ledgers of a ledger, wherein the control structures specify one or more controls for each container of the plurality of containers, the control structures for a given container of the plurality of containers to be used to determine allocation of exchanges to the given container for handling according to the configuration parameters of the given container, and generating, by the one or more processors, an entry in a sub-ledger of the plurality of sub-ledgers corresponding to the determined configuration parameters to broadcast the exchange in the sub-ledger according to the control structures of a corresponding container.

In some implementations, the computer-implemented method further including generating, by the one or more processors, the ledger according to the plurality of containers, wherein generating includes configuring the plurality of sub-ledgers associated with the plurality of containers based on the control structures, receiving, by the one or more processors via the communication network interface, configuration input for the capacity plan, the configuration input indicating the configuration parameters of each container of the plurality of containers, and receiving, by the one or more processors via the communication network interface, the control structures.

In some implementations, the computer-implemented method further including generating, by the one or more processors, the control structures specifying one or more controls for each container of the plurality of containers, wherein each control structure of the control structures includes and executes one or more instructions determining the sub-ledger of the plurality of sub-ledgers to receive the broadcasted exchange.

In some implementations, determining the configuration parameters with which the exchange is to be modeled is further based on at least one of cross-referencing, by the one or more processors, the exchange data with a control structure or applying, by the one or more processors, the control structure to the exchange data.

In some implementations, determining the configuration parameters with which the exchange is to be modeled is based on inputting the exchange data and the control structures and generating an output prediction of the sub-ledger of the plurality of sub-ledgers to generate the entry in and broadcast the exchange to.

In some implementations, the plurality of containers correspond to the capacity plan, and wherein each container of the plurality of containers includes configuration parameters specifying one or more aspects of handling a draw exchange included in the capacity plan.

In some implementations, the ledger to broadcast exchanges is associated with the capacity plan, the ledger including the plurality of sub-ledgers each associated with a container of the plurality of containers, wherein each exchange of the ledger is broadcasted within at least one sub-ledger of the plurality of sub-ledgers, and wherein the control structures model exchanges with the configuration parameters of a given sub-ledger of the plurality of sub-ledgers.

In some implementations, the computer-implemented method further including determining, by the one or more processors, global configuration parameters of the plurality of containers, wherein the global configuration parameters include an aggregate of the configuration parameters of each of the plurality of containers, and generating, by the one or more processors in real-time, one or more global estimates based on executing one or more functions calls with the control structures of each of the plurality of containers, wherein the one or more global estimates include at least one of a minimum threshold amount, a frequency, a response cycle, an end date cycle, a compliance rating.

In some implementations, the computer-implemented method further including establishing, by the one or more processors via the communication network interface utilizing a first application programming interface (API), a data feed associated with the exchange data, wherein the data feed is at least one of a credit card network, an exchange acquiring institution network, or a merchant network.

Some implementations relate to one or more non-transitory computer-readable storage media having instructions stored thereon that, when executed by at least one processing circuit, cause the at least one processing circuit to generate a plurality of containers to include configuration parameters of each container of the plurality of containers, receive, via a communication network interface, exchange data for an exchange, determine the configuration parameters with which the exchange is to be modeled based on the exchange data and control structures of a plurality of sub-ledgers of a ledger, wherein the control structures specify one or more controls for each container of the plurality of containers, the control structures for a given container of the plurality of containers to be used to determine allocation of exchanges to the given container for handling according to the configuration parameters of the given container, and generate an entry in a sub-ledger of the plurality of sub-ledgers corresponding to the determined configuration parameters to broadcast the exchange in the sub-ledger according to the control structures of a corresponding container.

Some implementations relate to a system to provide multiple sets of terms for individual transactions included in a line of credit. The system includes a communication network interface to interface with a communication network; a memory to store: settings for a line of credit extended to a borrower; a plurality of containers (or "buckets") corresponding to the line of credit, each container of the plurality of containers comprising (or defined by) a set of terms (e.g., configuration settings, instructions) specifying one or more aspects of handling (e.g., instructions for; settings for; financial terms to be applied to) a draw transaction included in in the line of credit (e.g., transaction on/from/against a line of credit, such as a credit card, wherein the transaction may be initiated by a swipe, tap, bump, biometric auth., etc.); and a ledger comprising or otherwise associated with the plurality of containers, the ledger to record transactions associated with the line of credit, the ledger comprising a plurality of sub-ledgers each associated with a container of the plurality of containers, wherein each transaction of the ledger is recorded on the ledger within or in association with a sub-ledger of the plurality of sub-ledgers, wherein a transaction is recorded in the ledger by a modification or adjustment to the one or more sub-ledgers of a given container of the plurality of containers, wherein a sub-ledger is to calculate debits and credits for transactions of a container. The system includes one or more processors to: receive, via the communication network interface, configuration input (e.g., from a lender/agent of a lender; from a borrower) for the line of credit, the configuration input indicating or specifying the set of terms of each container of the plurality of containers; receive, via the communication network interface, rule input (e.g., from a lender/agent of a lender; from a borrower), the rule input specifying one or more rules for each container of the plurality of containers, the one or more rules for a given container of the plurality of containers to be used to determine that a transaction is to be allocated (or associated) to the given container for handling according to the set of terms of the given container; generate (e.g., in the memory) the plurality of containers to include (or according to) the set of terms of each container of the plurality of containers; create (e.g., in the memory) the ledger according to the plurality of containers, including configuring the one or more sub-ledgers associated with the plurality of containers; and receive transaction data for a transaction and record the transaction in a sub-ledger of the ledger according to the rules of a corresponding container.

Some implementations relate to a system to provide configurable draw transaction terms associated with a line of credit. The system includes a memory to store: a ledger to record transactions associated with a line of credit; a plurality of sets of terms that each specify one or more aspects of handling (e.g., instructions for; settings for; financial terms to be applied to) a draw transaction included in in the line of credit (e.g., transaction on/from/against a line of credit, such as a credit card, wherein the transaction may be initiated by a swipe, tap, bump, biometric auth., etc.); and routing or sorting rules to associate the transactions with the plurality of sets of terms. The system includes one or more processors to: receive, via a communication network interface, configuration input (e.g., from a lender/agent of a lender; from a borrower) for the line of credit, the configuration input indicating or otherwise specifying the plurality of sets of terms; receive, via the communication network interface, rule input specifying one or more routing rules for each set of terms of the plurality of set of terms, wherein the one or more rules for a given set of terms defines characteristics of a transaction that is to be associated to the given set of terms for handling according to the given set of terms; create (e.g., in the memory) the ledger according to the plurality sets of terms, including configuring one or more sub-ledgers of the ledger that each correspond with a set of terms of the plurality of sets of terms; receive transaction data for a transaction; determine which set of terms of the plurality of sets of terms the transaction is to be associated with, according to the routing rules; and record the transaction in the ledger and associated with the sub-ledger corresponding to the determined set of terms.

Some implementations relate to a system to provide configurable draw transaction terms associated with a line of credit. The system includes one or more processors to: receive, via a communication network interface, configuration input (e.g., from a lender/agent of a lender; from a borrower) for a line of credit and indicating or otherwise specifying a plurality of sets of terms each defining one or more aspects of handling (e.g., instructions for; settings for; financial terms to be applied to) a draw transaction included in included in the line of credit (e.g., transaction on/from/against a line of credit, such as a credit card, wherein the transaction may be initiated by a swipe, tap, bump, biometric auth., etc.); receive, via the communication network interface, rule input specifying one or more routing rules for each set of terms of the plurality of set of terms, wherein the one or more rules for a given set of terms defines characteristics of a transaction that is to be associated to the given set of terms for handling according to the given set of terms; create, in a memory, a ledger for the line of credit according to the plurality sets of terms, including one or more sub-ledgers of the ledger that each correspond with a set of terms of the plurality of sets of terms, the ledger to record transactions associated with the line of credit; receive transaction data for a draw transaction included in the line of credit; determine which set of terms of the plurality of sets of terms the transaction is to be associated with, according to the routing rules; and record the transaction in the ledger, including in a sub-ledger associated with (e.g. corresponding to) the determined set of terms.

Some implementations relate to a system to provide multiple sets of terms for individual transactions included in a line of credit. The system includes a communication network interface to interface with a communication network. The system includes a plurality of virtual containers (e.g., buckets) defined or stored in a memory and corresponding to a line of credit, each virtual container of the plurality of virtual containers comprising or defined by a set of terms (e.g., configuration settings, instructions) specifying one or more aspects of handling (e.g., instructions for; settings for; financial terms to be applied to) a draw transaction included in the line of credit (e.g., transaction on/from/against a line of credit, such as a credit card, wherein the transaction may be initiated by a swipe, tap, bump, biometric auth., etc.). The system includes a ledger engine to maintain in a memory a ledger comprising (or otherwise associated with) the plurality of virtual containers, the ledger to record transactions associated with the line of credit, the ledger engine further to maintain within the ledger a plurality of sub-ledgers each associated with a virtual container of the plurality of containers, wherein each transaction of the ledger is recorded on the ledger within or in association with a sub-ledger of the plurality of sub-ledgers, wherein a transaction is recorded in the ledger by a modification or adjustment to the one or more sub-ledgers of a given virtual container of the plurality of containers, wherein a sub-ledger is to calculate debits and credits for transactions of a container. The system includes a product setup engine to: receive, via the communication network interface, configuration input (e.g., from a lender/agent of a lender; from a borrower) for the line of credit, the configuration input specifying or otherwise indicating the set of terms of each container of the plurality of virtual containers; create or configure (e.g., in the memory) the plurality of virtual containers according configuration input, including to create/configure the plurality of sub-ledgers; receive, via the communication network interface, rule input (e.g., from a lender/agent of a lender; from a borrower, the rule input) specifying one or more routing rules for each virtual container of the plurality of virtual containers, the one or more routing rules for a given virtual container of the plurality of containers to be used to determine that a transaction is to be allocated (or associated) to the given virtual container for handling according to the set of terms of the given virtual container; and create or configure (e.g., in the memory) the ledger, including the one or more sub-ledgers. The system includes a transaction engine to: receive transaction data for a transaction; determine which virtual container of the plurality of containers the transaction should be associated with, according to the routing rules; and provide the transaction data and indication of a determined virtual container to the ledger engine to record the transaction in a sub-ledger of the ledger.

In some implementations, the one or more processors are further to: generate a report (e.g., a statement, an accounting) of the line of credit according to all transactions recorded in the ledger and according to the plurality of sets of terms.

Some implementations relate to a system to associate a draw transaction of a line of credit with a set of terms. The system includes a communication network interface to interface with a communication network. The system includes a memory to store: settings for a line of credit extended to a borrower; a ledger including a plurality of sub-ledgers, the ledger to record transactions associated with a line of credit, each sub-ledger corresponding to a set of terms (e.g., configuration settings, instructions) specifying one or more aspects of handling (e.g., instructions for; settings for; financial terms to be applied to) a draw transaction included in the line of credit (e.g., transaction on/from/against a line of credit, such as a credit card, wherein the transaction may be initiated by a swipe, tap, bump, biometric auth., etc.); and routing rules that are to be used to associate a transaction with a set of terms of a given sub-ledger of the plurality of sub-ledgers (wherein the routing rules include at least one routing rule for the set of terms of each sub-ledger of the plurality of sub-ledger). The system includes one or more processors to: receive, via the communication network interface, transaction data for a transaction; request additional transaction data from a data enrichment partner, based on the transaction data and combine the additional transaction data into the transaction data (e.g., to enrich the transaction data); compare the transaction data to the routing rules or otherwise apply the routing rules to the transaction data; determine a set of terms with which the transaction is to be associated, based on comparing the transaction data to the routing rules or otherwise based on applying the routing rules to the transaction data; and create an entry in the ledger to record the transaction, including in the sub-ledger corresponding to the determined set of terms.

In some implementations, the transaction data comprises: transaction-specific data, including but not limited to an MCC code, a date, a time, a geolocation, and a merchant.

In some implementations, the transaction data comprises: line-of-credit-specific transaction data, including but not limited to a line of credit limit, a lending product, a portfolio, a status, a balance, and a delinquency measure.

In some implementations, the transaction data comprises: customer-specific transaction data, including but not limited to a date of birth, a customer address, and a zip code.

In some implementations, the transaction data is received from the lender (e.g., issuing bank, issuer of the line of credit).

10196) In some implementations, the transaction data is received from one or more of: a credit card network, a transaction acquiring institution (e.g., acquiring bank), or a merchant.

Some implementations relate to a system to associate a draw transaction of a line of credit with a set of terms. The system includes a communication network interface to interface with a communication network (e.g., to receive transaction data). The system includes a ledger engine (or ledger service) to maintain (e.g., in a memory) a ledger to record transactions associated with a line of credit, the ledger including a plurality of sub-ledgers each corresponding to a set of terms (e.g., configuration settings, instructions) specifying one or more aspects of handling (e.g., instructions for, settings for, financial terms to be applied to) a draw transaction included in the line of credit (e.g., transaction on/from/against a line of credit, such as a credit card, wherein the transaction may be initiated by a swipe, tap, bump, biometric auth., etc.). The system includes a rule engine (or rule service) to receive rule input (e.g., from a lender/agent of a lender; from a borrower), the rule input specifying one or more routing rules (e.g., parameters}} for each sub-ledger of the plurality of sub-ledgers, the one or more routing rules for a given sub-ledger to be used to determine that a transaction is to be allocated (or associated) to the given sub-ledger for handling according to the set of terms of the given sub-ledger. The system includes a routing engine (or routing service) to: receive a routing rule of the one or more routing rules and to receive transaction data for a transaction; and determine based on the routing rule and the transaction data if the transaction is to be associated with (e.g., recorded in) a sub-ledger corresponding to the routing rule. The system includes a transaction engine to: receive transaction data for a transaction; iteratively provide to the routing engine the transaction data and a next routing rule of the plurality of routing rules; provide the transaction data and an indication of a determined sub-ledger to the ledger engine to record the transaction in the determined sub-ledger of the ledger.

In some implementations, the transaction data comprises a context, which includes a set of one or more transaction variables (e.g. transaction data fields) and a value associated with each of the one or more transaction variables.

In some implementations, the indication of the determined sub-ledger comprises one or more of: an identification ID number corresponding to the determined sub-ledger; the routing rule corresponding to the determined sub-ledger the set of terms corresponding to the determined sub-ledger.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc.

Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

What is claimed is:

1. A system to model exchanges of a capacity plan with configuration parameters, comprising:
   a communication network interface to interface with a communication network;
   a memory to store:
      a ledger to broadcast exchanges associated with the capacity plan, the ledger comprising a plurality of sub-ledgers each associated with a container of a plurality of containers, wherein each exchange of the ledger is broadcasted within a sub-ledger of the plurality of sub-ledgers; and
      control structures to model exchanges with the configuration parameters of a given sub-ledger of the plurality of sub-ledgers, the control structures specifying one or more controls for each container of the plurality of containers, the control structures for a given container of the plurality of containers configured to be used to determine allocation of exchanges to the given container for handling according to configuration parameters of the given container; and
   one or more processors to:
      receive, via the communication network interface, exchange data for an exchange;
      determine the configuration parameters with which the exchange is to be modeled based on the exchange data and the control structures of the plurality of sub-ledgers; and
      generate an entry in the sub-ledger corresponding to the determined configuration parameters to broadcast the exchange in the sub-ledger of the plurality of sub-ledgers according to the control structures of a corresponding container.

2. The system of claim 1, wherein the one or more processors are further to:
   request or collect additional exchange data from a data source identified based on the exchange data; and
   enrich the exchange data based on aggregating the additional exchange data into the exchange data.

3. The system of claim 1, wherein determining the configuration parameters with which the exchange is to be modeled is further based on at least one of:
   cross-referencing the exchange data with the control structure; or
   applying the control structure to the exchange data.

4. The system of claim 1, wherein determining the configuration parameters with which the exchange is to be modeled is based on inputting the exchange data and the control structure and generating an output prediction of the sub-ledger of the plurality of sub-ledgers to generate the entry in and broadcast the exchange to.

5. The system of claim 1, wherein the one or more processors are further to:
   generate the ledger according to the plurality of containers, wherein generating comprises configuring one or more sub-ledgers associated with the plurality of containers based on the control structures.

6. The system of claim 1, wherein the one or more processors are further to:
   generate the control structures specifying one or more controls for each container of the plurality of containers, wherein each control structure of the control structures comprises and executes one or more instructions determining the sub-ledger of the plurality of sub-ledgers to receive the broadcasted exchange.

7. The system of claim 6, wherein a first container of the plurality of containers corresponds to a first control structure of the control structures, and wherein a second container of the plurality of containers corresponds to a second control structure of the control structures, wherein the one or more instructions of each control structure restrict or allow the broadcasting of the exchange to one of the plurality of containers based on a rules dataset.

8. The system of claim 1, wherein the exchange data comprises at least one of:
   exchange-specific data comprising one or more of a merchant identifier, a date, a time, a geolocation of the exchange, a merchant, a hash, or a cryptogram;
   capacity-plan-specific exchange data comprising one or more of a line of capacity limit, a plan product, a portfolio, a status, a balance, or a delinquency measure; and
   customer-specific exchange data comprising one or more of a date of birth, a customer identifier, a customer address, a geolocation of a customer, a zip code, a wallet identifier, or a public key.

9. The system of claim 1, wherein receiving the exchange data further comprises:
   establishing, via the communication network interface utilizing a first application programming interface (API), a data feed associated with the exchange data, wherein the data feed is at least one of a credit card network, an exchange acquiring institution network, or a merchant network.

10. The system of claim 1, wherein the one or more processors are further to:
    in response to broadcasting the exchange in the sub-ledger of the plurality of sub-ledgers, update a second sub-ledger based on the exchange data and according to a second control structure of the control structures of a second corresponding container.

11. The system of claim 1, wherein the one or more processors are further to:
    determine global configuration parameters of the plurality of containers, wherein the global configuration parameters comprise an aggregate of the configuration parameters of each of the plurality of containers; and
    generate, in real-time, one or more global estimates based on executing one or more functions calls with the control structure of each of the plurality of containers, wherein the one or more global estimates comprise at least one of a minimum threshold amount, a frequency, a response cycle, an end date cycle, a compliance rating.

12. A system to model exchanges of a capacity plan with configuration parameters, comprising:
    a communication network interface to interface with a communication network;
    a ledger to broadcast exchanges associated with the capacity plan, the ledger comprising a plurality of sub-ledgers each associated with a container of a plurality of containers, wherein each exchange of the ledger is broadcasted within a sub-ledger of the plurality of sub-ledgers according to control structures of a corresponding container;
    the control structures to receive input specifying the control for each sub-ledger of the plurality of sub-ledgers, the control structures to further model exchanges with the configuration parameters of a given sub-ledger of the plurality of sub-ledgers, the control structures specifying one or more controls for each container of the plurality of containers, the control structures for a given container of the plurality of containers configured to be used to determine allocation of exchanges to the given container for handling according to configuration parameters of the given container;
    a capacity modeler to:
        receive the control structures and exchange data for an exchange;
        determine the sub-ledger to broadcast the exchange corresponding to a control structure of the one or more control structures; and
    an exchange modeler to:
        receive, via the communication network interface, exchange data for the exchange;
        continuously provide to the capacity modeler the exchange data and the control structures; and
        provide an indication of a determined sub-ledger to the ledger to broadcast the exchange in the determined sub-ledger of the plurality of sub-ledgers.

13. The system of claim 12, wherein the ledger is further to:
    generate, utilizing the control structure, an entry in the sub-ledger to broadcast the exchange.

14. The system of claim 12, where the exchange modeler is further to:
    request or collect additional exchange data from a data source identified based on the exchange data; and
    enrich the exchange data based on aggregating the additional exchange data into the exchange data.

15. The system of claim 12, wherein a first container of the plurality of containers corresponds to a first control structure of the control structures, and wherein a second container of the plurality of containers corresponds to a second control structure of the control structures, wherein one or more executable instructions of each control structure restrict or allow the broadcasting of the exchange to one of the plurality of containers based on a rules dataset.

16. The system of claim 12, wherein the exchange data comprises at least one of:
    exchange-specific data comprising one or more of a merchant identifier, a date, a time, a geolocation, a merchant, a hash, or a cryptogram;
    capacity-plan-specific exchange data comprising one or more of a line of capacity limit, a plan product, a portfolio, a status, a balance, or a delinquency measure; and
    customer-specific exchange data comprising one or more of a date of birth, a customer identifier, a customer address, a geolocation, a zip code, a wallet identifier, or a public key.

17. The system of claim 12, wherein receiving the exchange data by the exchange modeler further comprises:
    establishing, via the communication network interface utilizing a first application programming interface (API), a data feed associated with the exchange data, wherein the data feed is at least one of a credit card network, an exchange acquiring institution network, or a merchant network.

18. The system of claim 12, wherein the ledger is further to:
    in response to broadcasting the exchange in the sub-ledger of the plurality of sub-ledgers, update a second sub-ledger based on the exchange data and according to a second control structure of the control structures of a second corresponding container.

19. A computer-implemented method to model exchanges of a capacity plan with configuration parameters, the computer-implemented method comprising:
    receiving, by one or more processors, exchange data for an exchange;
    determining, by the one or more processors, configuration parameters with which the exchange is to be modeled based on the exchange data and control structures of the plurality of sub-ledgers, wherein the control structures model exchanges with the configuration parameters of a given sub-ledger of a plurality of sub-ledgers, the control structures specifying one or more controls for each container of a plurality of containers, the control structures for a given container of the plurality of containers configured to be used to determine allocation of exchanges to the given container for handling according to configuration parameters of the given container; and
    generating, by the one or more processors, an entry in a sub-ledger of the plurality of sub-ledgers of a ledger corresponding to the determined configuration parameters to broadcast the exchange in the sub-ledger of the plurality of sub-ledgers according to the control structures of a corresponding container of the plurality of containers, the ledger is associated with the capacity plan and comprising the plurality of sub-ledgers each associated with a container of the plurality of containers, wherein each exchange of the ledger is broadcasted within the sub-ledger of the plurality of sub-ledgers.

20. The computer-implemented method of claim 19, further comprising:
    generating, by the one or more processors, the control structures, wherein each control structure of the control structures comprises and executes one or more instructions determining the sub-ledger of the plurality of sub-ledgers to receive the broadcasted exchange;
    wherein determining the configuration parameters with which the exchange is to be modeled is based on inputting the exchange data and the control structure and generating an output prediction of the sub-ledger of the plurality of sub-ledgers to generate the entry in and broadcast the exchange to.

* * * * *